US012574508B2

(12) United States Patent
Wang

(10) Patent No.: US 12,574,508 B2
(45) Date of Patent: Mar. 10, 2026

(54) INTRA PREDICTION METHODS, ENCODER AND DECODER

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 32 days.

(21) Appl. No.: 18/616,629

(22) Filed: Mar. 26, 2024

(65) Prior Publication Data

US 2024/0244193 A1       Jul. 18, 2024

Related U.S. Application Data

(63) Continuation of application No. PCT/CN2021/121044, filed on Sep. 27, 2021.

(51) Int. Cl.
| | |
|---|---|
| *H04N 19/11* | (2014.01) |
| *H04N 19/105* | (2014.01) |
| *H04N 19/119* | (2014.01) |
| *H04N 19/176* | (2014.01) |
| *H04N 19/593* | (2014.01) |

(52) U.S. Cl.
CPC ........... *H04N 19/11* (2014.11); *H04N 19/105* (2014.11); *H04N 19/119* (2014.11); *H04N 19/176* (2014.11); *H04N 19/593* (2014.11)

(58) Field of Classification Search
CPC .... H04N 19/119; H04N 19/593; H04N 19/00; H04N 19/105; H04N 19/11; H04N 19/176
See application file for complete search history.

(56) References Cited

U.S. PATENT DOCUMENTS

| | | | | |
|---|---|---|---|---|
| 2021/0274214 A1* | 9/2021 | Moon | ................. | H04N 19/527 |
| 2024/0275943 A1* | 8/2024 | Zhang | ................. | H04N 19/583 |

FOREIGN PATENT DOCUMENTS

| | | |
|---|---|---|
| CN | 102045554 A | 5/2011 |
| CN | 110662033 A | 1/2020 |
| CN | 112292854 A | 1/2021 |

OTHER PUBLICATIONS

International Search Report in the international application No. PCT/CN2021/121044, mailed on Jun. 28, 2022. 6 pages with English translation.
Written Opinion of the International Search Authority in the international application No. PCT/CN2021/121044, mailed on Jun. 28, 2022. 7 pages with English translation.
Wang, Yang et al. "EE2-related: Template-based intra mode derivation using MPMs" Joint Video Experts Team (JVET) of ITU-T SG 16 WP 3 and ISO/IEC JTC 1/SC 29 22nd Meeting, by teleconference, Apr. 20-28, 2021, Apr. 28, 2021 (Apr. 28, 2021), p. 2. 4 pages.

* cited by examiner

*Primary Examiner* — Tsion B Owens
(74) *Attorney, Agent, or Firm* — BAYES PLLC

(57) ABSTRACT

Intra prediction methods, an encoder, and a decoder are provided. In the method, a template of a current block is divided into sub-templates; a prediction mode is determined according to costs of candidate modes on the sub-templates of the current block; an intra prediction value of a current frame can then be determined according to the prediction mode.

18 Claims, 13 Drawing Sheets

Templates

L2

The Current CU

N

L1

M

300

| Sub-block 0 | Sub-block 1 |
|:---:|:---:|
| Sub-block 2 | Sub-block 3 |

(a)

| Sub-block 0 | Sub-block 1 | Sub-block 2 | Sub-block 3 |
|:---:|:---:|:---:|:---:|
| Sub-block 4 | Sub-block 5 | Sub-block 6 | Sub-block 7 |
| Sub-block 8 | Sub-block 9 | Sub-block 10 | Sub-block 11 |
| Sub-block 12 | Sub-block 13 | Sub-block 14 | Sub-block 15 |

Template 0

The Current Block

Sub-Template 2

Sub-Template 1

The Current Block

Figure 11:
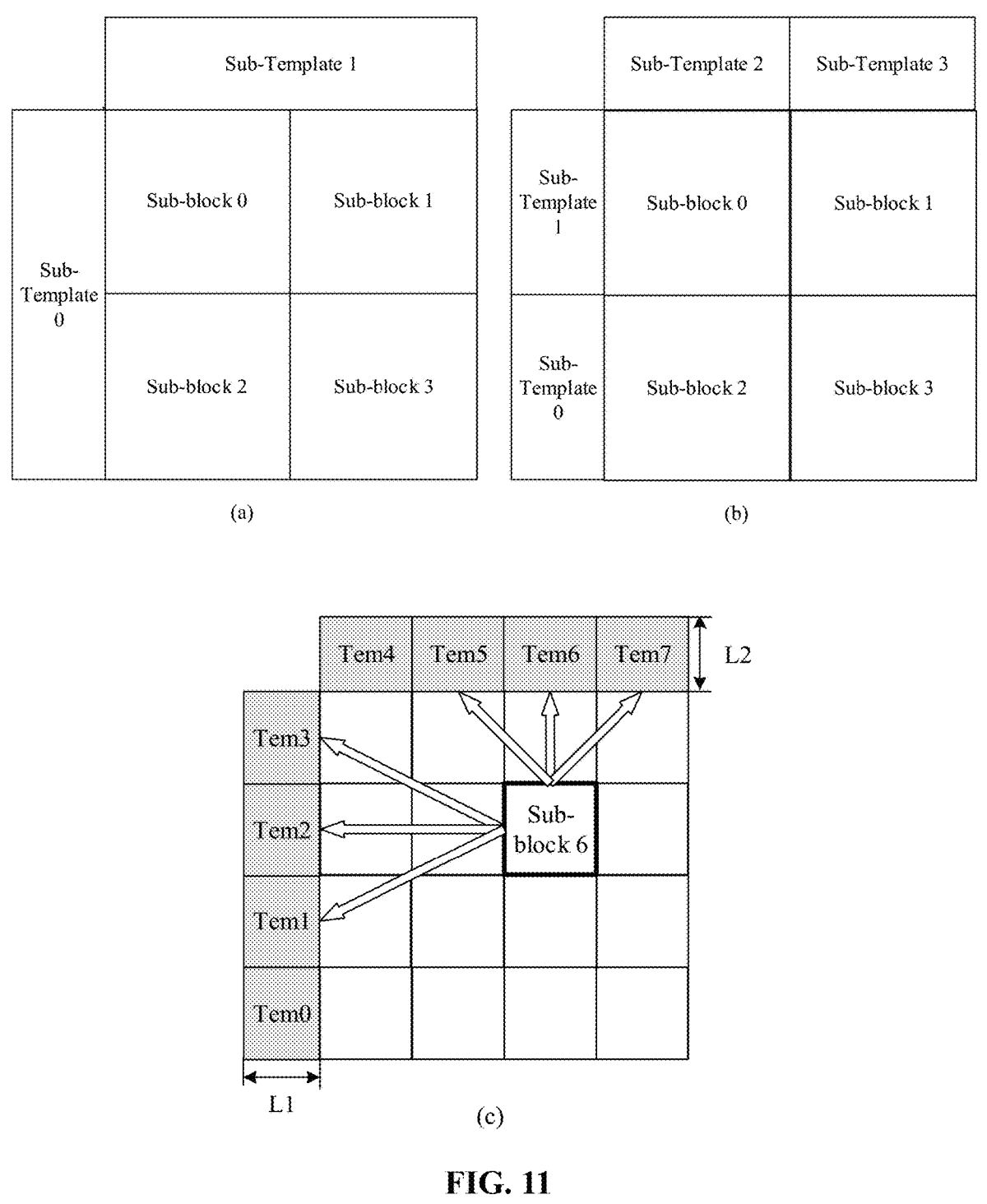

| | Sub-Template 1 | |
|---|---|---|
| Sub-Template 0 | Sub-block 0 | Sub-block 1 |
| | Sub-block 2 | Sub-block 3 |

(a)

| | Sub-Template 2 | Sub-Template 3 |
|---|---|---|
| Sub-Template 1 | Sub-block 0 | Sub-block 1 |
| Sub-Template 0 | Sub-block 2 | Sub-block 3 |

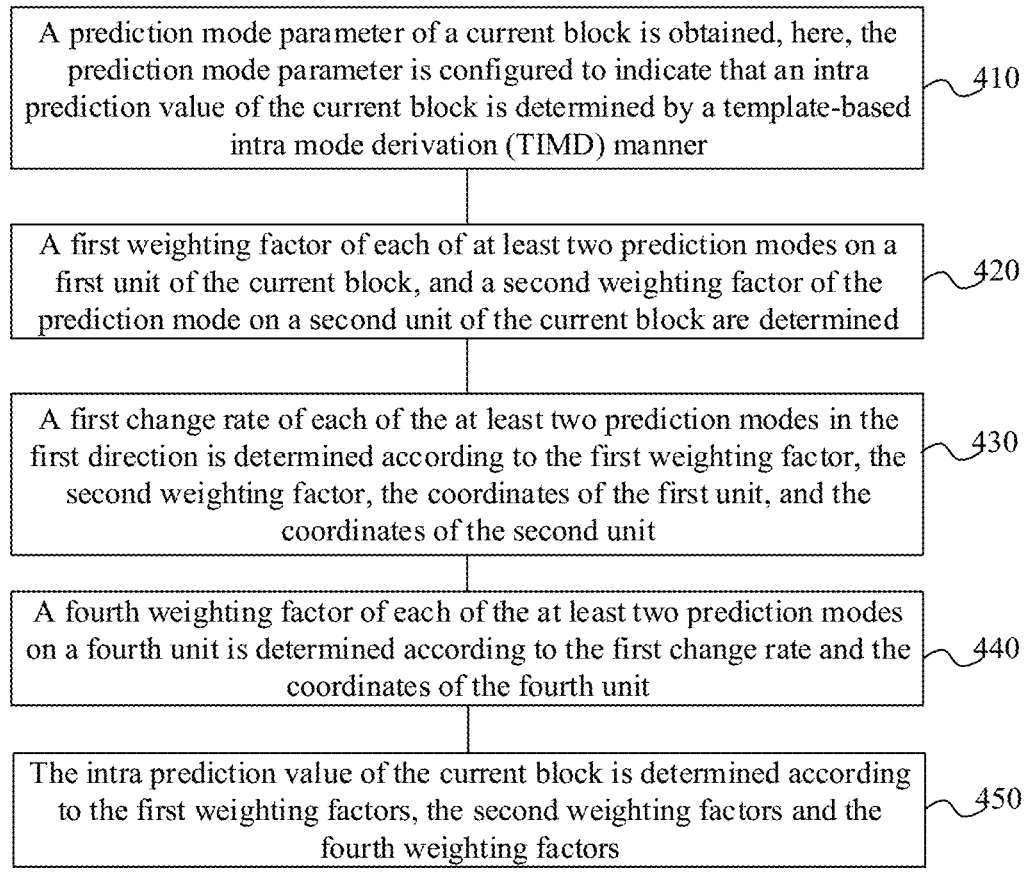

400

A prediction mode parameter of a current block is obtained, here, the prediction mode parameter is configured to indicate that an intra prediction value of the current block is determined by a template-based intra mode derivation (TIMD) manner — 410

A first weighting factor of each of at least two prediction modes on a first unit of the current block, and a second weighting factor of the prediction mode on a second unit of the current block are determined — 420

A first change rate of each of the at least two prediction modes in the first direction is determined according to the first weighting factor, the second weighting factor, the coordinates of the first unit, and the coordinates of the second unit — 430

A fourth weighting factor of each of the at least two prediction modes on a fourth unit is determined according to the first change rate and the coordinates of the fourth unit — 440

The intra prediction value of the current block is determined according to the first weighting factors, the second weighting factors and the fourth weighting factors — 450

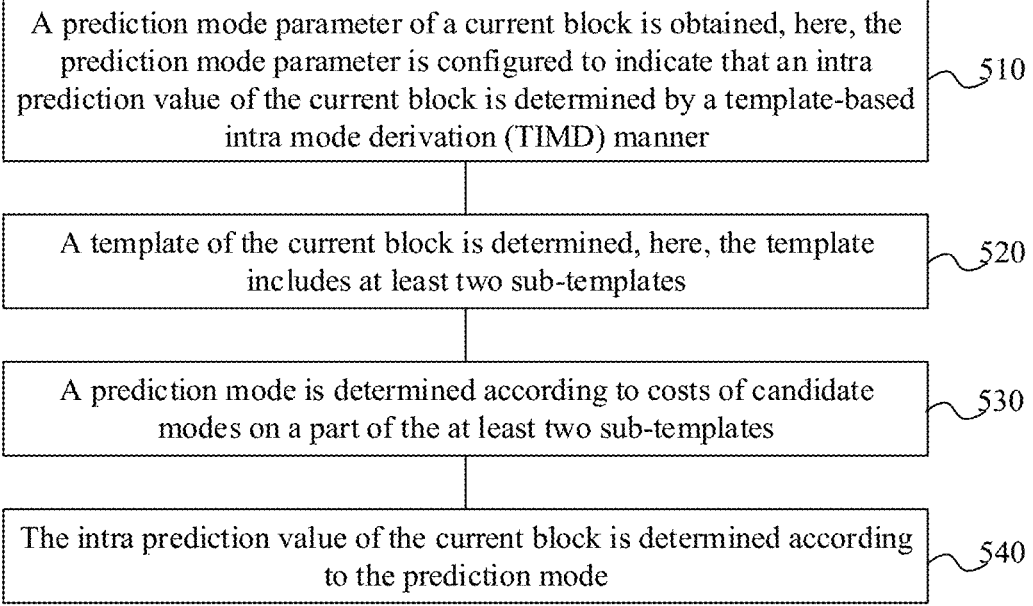

| A prediction mode parameter of a current block is obtained, here, the prediction mode parameter is configured to indicate that an intra prediction value of the current block is determined by a template-based intra mode derivation (TIMD) manner | ~510 |

| A template of the current block is determined, here, the template includes at least two sub-templates | ~520 |

| A prediction mode is determined according to costs of candidate modes on a part of the at least two sub-templates | ~530 |

| The intra prediction value of the current block is determined according to the prediction mode | ~540 |

FIG. 14

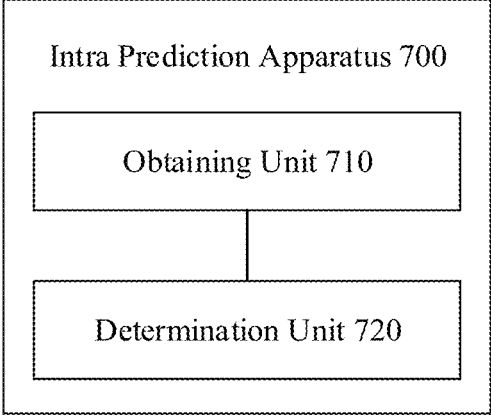

Intra Prediction Apparatus 700

Obtaining Unit 710

Determination Unit 720

FIG. 15

INTRA PREDICTION METHODS, ENCODER AND DECODER

CROSS-REFERENCE TO RELATED APPLICATION

This application is a continuation of International Patent Application No. PCT/CN2021/121044, filed on Sep. 27, 2021, the content of which is hereby incorporated by reference in its entirety.

BACKGROUND

As the improvement of people's requirements for video display quality, new forms of video applications such as high-definition (HD) and ultra-high definition (UHD) video have emerged. Since H.265/High Efficiency Video Coding (HEVC) can no longer meet the needs of the rapid development of video applications, the Joint Video Exploration Team (JVET) proposed the next generation video encoding standard, i.e., H.266/Versatile Video Coding (VVC).

In H.266/VVC, with the template-based intra mode derivation (TIMD) solution, a correlation between the template and the current block is utilized, and the prediction effect of the intra prediction mode on the current block is estimated by the prediction effect of the intra prediction mode on the template. One or two modes having the smallest cost are ultimately selected as the prediction modes of the current block. However, the accuracy of the prediction effect of the TIMD solution is required to be further improved.

SUMMARY

Embodiments of the disclosure provide an intra prediction method, an encoder, a decoder, and an encoding and decoding system. A prediction mode is determined according to costs of candidate modes on sub-templates of the current block, which contributes to more accurate intra prediction, and thereby improving compression efficiency.

In a first aspect, an intra prediction method is provided. The method is applied to an encoder, and the method includes the following operations. A prediction mode parameter of a current block is obtained. The prediction mode parameter is configured to indicate that an intra prediction value of the current block is determined in template-based intra mode derivation (TIMD) manner. A template of the current block is determined. The template includes at least two sub-templates. A prediction mode is determined according to costs of candidate modes on a part of the at least two sub-templates. The intra prediction value of the current block is determined according to the prediction mode.

In a second aspect, an intra prediction method is provided. The method is applied to a decoder, and the method includes the following operations. A prediction mode parameter of a current block is obtained. The prediction mode parameter is configured to indicate that an intra prediction value of the current block is determined in template-based intra mode derivation (TIMD) manner. A template of the current block is determined. The template includes at least two sub-templates. A prediction mode is determined according to costs of candidate modes on a part of the at least two sub-templates. The intra prediction value of the current block is determined according to the prediction mode.

In a third aspect, a decoder is provided. The decoder includes: a processor and a memory; wherein the memory is configured to store a computer program, and the processor is configured to call and run the computer program stored in the memory, to enable the decoder to execute operations of: obtaining a prediction mode parameter of a current block, wherein the prediction mode parameter is configured to indicate that an intra prediction value of the current block is determined in template-based intra mode derivation (TIMD) manner; determining a template of the current block, wherein the template comprises at least two sub-templates; determining a prediction mode according to costs of candidate modes on a part of the at least two sub-templates; and determining the intra prediction value of the current block according to the prediction mode.

In a fourth aspect, an encoder is provided. The encoder includes: a processor and a memory; wherein the memory is configured to store a computer program, and the processor is configured to call and run the computer program stored in the memory, to enable the encoder to execute operations of: obtaining a prediction mode parameter of a current block, wherein the prediction mode parameter is configured to indicate that an intra prediction value of the current block is determined in a template-based intra mode derivation (TIMD) manner; determining a template of the current block, wherein the template comprises at least two sub-templates; determining a prediction mode according to costs of candidate modes on a part of the at least two sub-templates; and determining the intra prediction value of the current block according to the prediction mode.

BRIEF DESCRIPTION OF THE DRAWINGS

FIG. 9 is a specific example of sub-blocks provided by an embodiment of the disclosure.

FIG. 11 is a specific example of sub-templates and sub-blocks provided by an embodiment of the disclosure.

FIG. 12 is a schematic flowchart of another intra prediction method provided by an embodiment of the disclosure.

FIG. 14 is a schematic flowchart of another intra prediction method provided by an embodiment of the disclosure.

FIG. 15 is a schematic block diagram of an intra prediction apparatus provided by an embodiment of the disclosure.

DETAILED DESCRIPTION

The technical solutions in the embodiments of the disclosure will be described below in conjunction with the drawings in the embodiments of the disclosure.

The disclosure applies to the field of video encoding and decoding. Firstly, an encoding and decoding framework, which the embodiments of the disclosure are applicable to, is illustrated in conjunction with FIGS. 1 and 2. Here, the encoding and decoding framework is a block-based hybrid coding framework adopted by the current unified video encoding and decoding standard.

Figure 1:
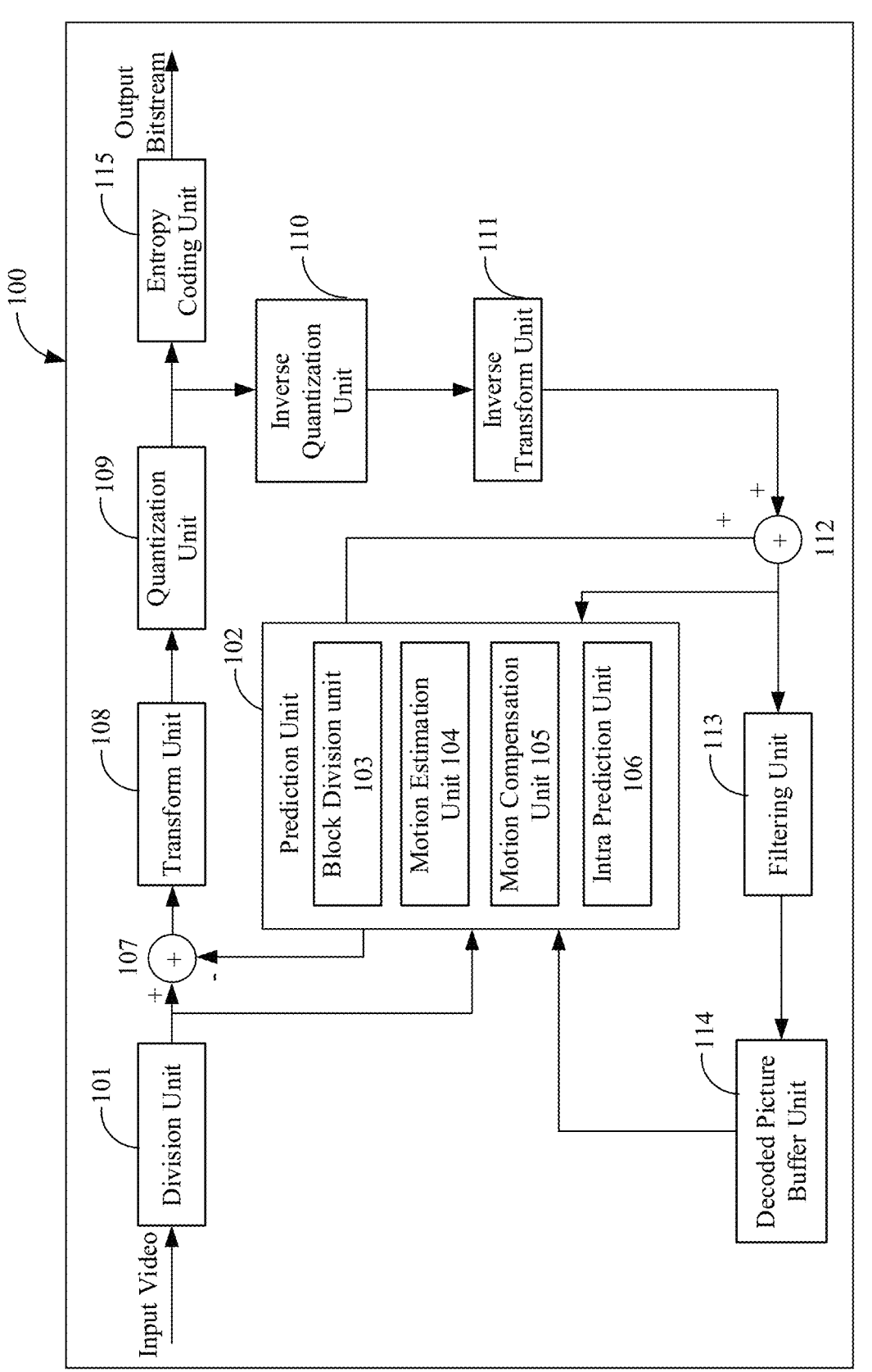
FIG. 1 is a schematic block diagram of an encoder provided by an embodiment of the disclosure.

FIG. 1 is a schematic block diagram of an encoder 100 provided by an embodiment of the disclosure. As shown in FIG. 1, the encoder 100 may include a division unit 101, a prediction unit 102, a first adder 107, a transform unit 108, a quantization unit 109, an inverse quantization unit 110, an inverse transform unit 111, a second adder 112, a filtering unit 113, a Decoded Picture Buffer (DPB) unit 114, and an entropy coding unit 115.

The division unit 101 divides a picture in an input video into one or more square coding tree units (CTUs) or largest coding units (LCUs) of the same size. Exemplarily, the size of the CTUs or LCUs is 128×128 or 64×64 pixel dots. The division unit 101 divides a picture into multiple tiles, and may further divide a tile into one or more bricks. A tile or a brick may include one or more complete and/or partial CTUs or LCUs. Additionally, the division unit 101 may form one or more slices. A slice may include one or more tiles arranged in a grid order in the picture, or one or more tiles covering a rectangular region in the picture. The division unit 101 may further form one or more sub-pictures, and a sub-picture may include one or more slices, tiles, or bricks.

In the encoder 100, the division unit 101 transmits CTUs or LCUs to the prediction unit 102. Generally, the prediction unit 102 may consist of a block division unit 103, a Motion Estimation (ME) unit 104, a Motion Compensation (MC) unit 105, and an intra prediction unit 106. The ME unit 104 and the MC unit 105 may form an inter prediction unit.

Specifically, the block division unit 103 may further divide the input CTUs or LCUs into smaller Coding Units (CUs). The CUs may further be divided into prediction units (PUs), or the like, which is not limited.

The prediction unit 102 may use the ME unit 104 and the MC unit 105 to obtain an inter prediction block of the current block (for example, a CU, a PU, or the like). The intra prediction unit 106 may obtain an intra prediction block of the current block by various intra prediction modes including the TIMD mode.

Due to strong correlation between adjacent pixels in a frame of a video, the use of an intra prediction method in the video encoding and decoding technology may contribute to eliminating spatial redundancy between adjacent pixels. Due to strong similarity between adjacent frames in a video, the use of an inter prediction method in the video encoding and decoding technology may contribute to eliminating temporal redundancy between adjacent frames, thereby improving coding efficiency.

The prediction unit 102 outputs a prediction block of the current block, and the first adder 107 calculates a difference, that is, a residual block, between the current block in the output of the division unit 101 and the prediction block of the current block. The transform unit 108 reads the residual block and performs one or more transform operations on the residual block to obtain coefficients. The quantization unit 109 quantizes the coefficients and outputs quantized coefficients (i.e., levels). The inverse quantization unit 110 performs a scaling operation on the quantized coefficients to output reconstructed coefficients. The inverse transform unit 111 performs one or more inverse transformations corresponding to the transformations in the transform unit 108, and outputs the residual block. The second adder 112 calculates a reconstructed block by adding the residual block to the prediction block of the current block from the prediction unit 102. The second adder 112 further sends its output to the prediction unit 102 to be used as an intra prediction reference. After all the blocks in the picture have been reconstructed, the filtering unit 113 performs in-loop filtering on the reconstructed picture.

The outputs of the filtering unit 113 are decoded pictures which are buffered into the DPB unit 114. The DPB 114 outputs the decoded pictures according to timing and control information. Here, the pictures stored in the DPB 114 may further be used as a reference for the prediction unit 102 to perform inter prediction or intra prediction. Finally, the entropy coding unit 115 signals parameters necessary for decoding the pictures from the encoder 100 (for example, block division information, mode information such as prediction, transformation, quantization, entropy coding, in-loop filtering, or parameter information, or the like) into a bitstream, that is, the encoder 100 finally outputs the bitstream.

In addition, the encoder 100 may have a processor and a memory including a computer program. When the processor reads and runs the computer program, the encoder 100 reads an input video and generates a corresponding bitstream. Alternatively, the encoder 100 may further be a computing device having one or more chips. The units implemented as integrated circuits on the chip have connection and data exchange functions similar to the corresponding units in FIG. 1.

Figure 2:
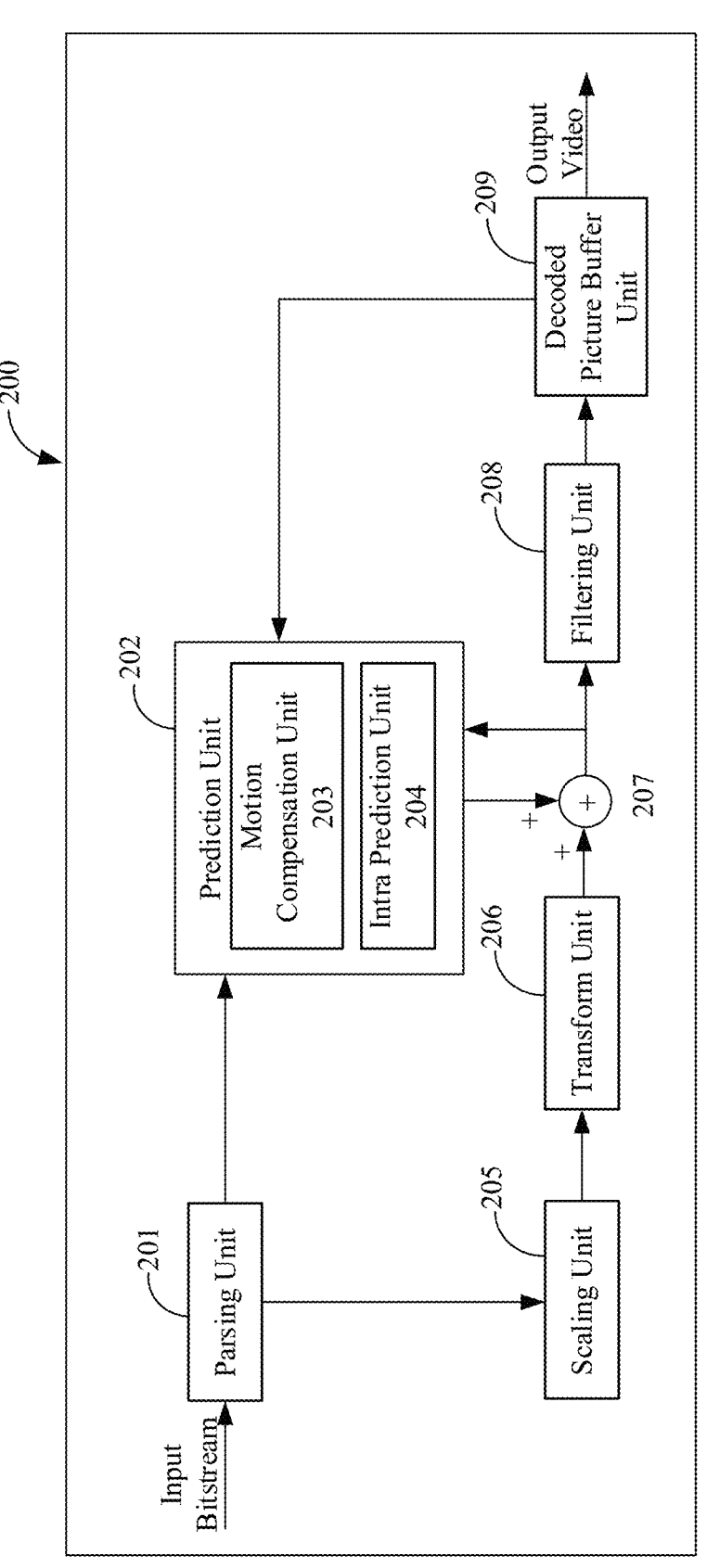
FIG. 2 is a schematic block diagram of a decoder provided by an embodiment of the disclosure.

FIG. 2 is a schematic block diagram of a decoder 200 provided by an embodiment of the disclosure. As shown in FIG. 2, the decoder 200 may include a parsing unit 201, a prediction unit 202, a scaling unit 205, a transform unit 206, an adder 207, a filtering unit 208, and a decoded picture buffer unit 209.

The input bitstream of the decoder 200 may be the bitstream output by the encoder 100. The parsing unit 201 parses the input bitstream, for example, performs analysis according to existing information to determine the same block division information, mode information (prediction, transformation, quantization, entropy coding, in-loop filtering, or the like), or parameter information as that of the coding side, so as to ensure that the reconstructed picture obtained by the coding side and the decoded picture obtained by the decoding side are the same. The parsing unit 201 sends the obtained mode information or parameter information to the unit in the decoder 200.

The prediction unit 202 determines a prediction block of the current coding block (for example, a CU, a PU, or the like). Here, the prediction unit 202 may include a motion compensation unit 203 and an intra prediction unit 204. Specifically, in a case where an inter coding mode is indicated for decoding the current coding block, the prediction unit 202 transfers relevant parameters from the parsing unit 201 to the motion compensation unit 203 to obtain an inter prediction block. In a case where an intra prediction mode (including a TIMD flag-based TIMD mode) is indicated for decoding the current coding block, the prediction unit 202 transfers the relevant parameters from the parsing unit 201 to the intra prediction unit 204 to obtain an intra prediction block.

The scaling unit 205 has the same function as the inverse quantization unit 110 in the encoder 100. The scaling unit 205 performs a scaling operation on the quantization coefficients (i.e., levels) from the parsing unit 201 to obtain reconstructed coefficients. The transform unit 206 has the same function as the inverse transform unit 111 in the encoder 100. The transform unit 206 performs one or more transform operations (i.e., inverse operations of one or more transform operations performed by the inverse transform unit 111 in the encoder 100) to obtain a residual block.

The adder 207 performs an add operation on its inputs (the prediction block from the prediction unit 202 and the residual block from the transform unit 206) to obtain a reconstructed block of the current coding block. The reconstructed block is further sent to the prediction unit 202 to be used as a reference for other blocks encoded under the intra prediction mode.

After all the blocks in the picture have been reconstructed, the filtering unit 208 performs in-loop filtering on the reconstructed picture. Here, the output of the filtering unit 208 is a decoded picture which is buffered into the DPB 209. The DPB 209 outputs the decoded picture according to timing and control information. The picture stored in the DPB 209 may further be used as a reference for the prediction unit 202 to perform inter prediction or intra prediction.

Furthermore, the decoder 200 may have a processor and a memory including a computer program. When the processor reads and runs the computer program, the decoder 200 reads an input bitstream and generates a corresponding decoded video. Alternatively, the decoder 200 may further be a computing device having one or more chips. These units implemented as integrated circuits on the chip have connection and data exchange functions similar to the corresponding units in FIG. 2.

It is to be noted that a basic flow of a video encoder/decoder under a block-based hybrid coding framework is described above in conjunction with FIG. 1 or FIG. 2, and the encoding and decoding framework or the basic flow is only used to illustrate the embodiments of the disclosure and is not intended to limit. For example, some modules or operations of the framework or flow may be optimized as the technology develops. In a specific implementation, the technical solutions provided by the embodiments of the disclosure may be applied flexibly according to actual needs.

In the embodiments of the disclosure, the current block refers to the current coding unit (CU), or the current prediction unit (PU), or other coding blocks, which is not limited.

Figure 3:
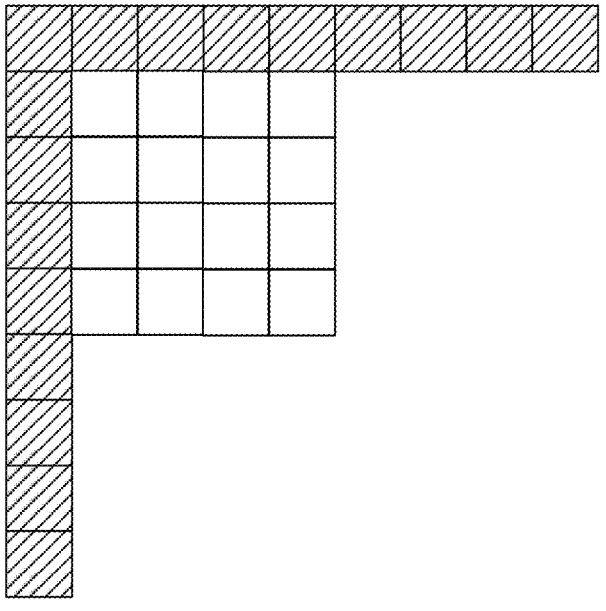
FIG. 3 is an example of performing prediction on a current block taking reconstructed pixels as reference pixels.

Exemplarily, in the intra prediction unit 106 of the encoder 100 or the intra prediction unit 204 of the decoder 200, reconstructed pixels that have already been encoded at the periphery of the current block (for example, pixels in the above reconstructed picture) may be used as reference pixels to perform prediction on the current block. FIG. 3 illustrates an example of performing prediction on the current block taking the reconstructed pixels as reference pixels. As shown in FIG. 3, the white-filled 4×4 block is the current block, and the shadow-filled pixels in the left row of the current block and in the upper column are reference pixels of the current block. The intra prediction unit uses these reference pixels to perform prediction on the current block. In some embodiments, the reference pixels may already be all available, that is, all of the reference pixels have been coded and decoded. In some other embodiments, the reference pixels may also be partially unavailable. For example, in a case where the current block is on the leftmost of the whole frame, the reference pixels on the left of the current block are unavailable. Alternatively, in a case where the part on the left bottom of the current block has not been coded and decoded when the current block is coded and decoded, the reference pixels on the left bottom are also not available. In a case where the reference pixels are unavailable, available reference pixels or certain values or certain methods may be used to fill, or not fill, which is not limited by the disclosure. In some embodiments, Multiple reference line (MRL) intra prediction method may be used, that is, more reference pixels are used to improve coding efficiency.

There are various prediction modes for intra prediction. For example, in H.264, 9 modes (mode 0 to mode 8) may be used for intra prediction on a 4×4 block. Here, in mode 0, the pixels above the current block are copied to the current block as prediction values in a numerical direction. In mode 1, the reference pixels on the left are copied to the current block as prediction values in a horizontal direction. In mode 2 DC, the average value of eight points, i.e., A to D and I to L, is taken as a prediction value for all points, In modes 3 to 8, the reference pixels are copied to a corresponding position of the current block in a certain angle respectively. Since some positions of the current block cannot correspond exactly to the reference pixels, it may be necessary to use the weighted average value of the reference pixels, or the interpolated sub-pixels of the reference pixels.

Figure 4:
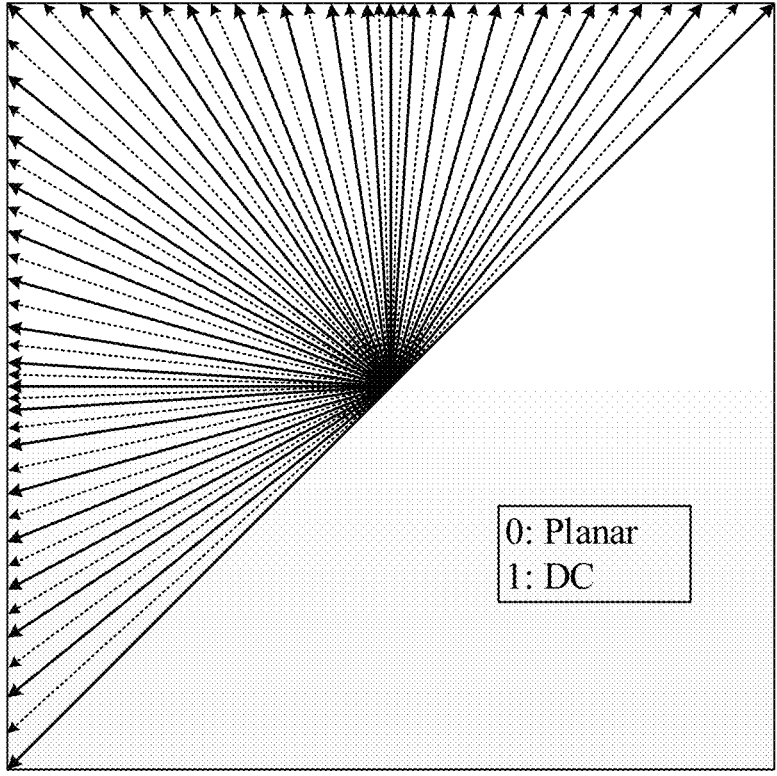
FIG. 4 is an example of an intra prediction mode.
Figures 5, 6:
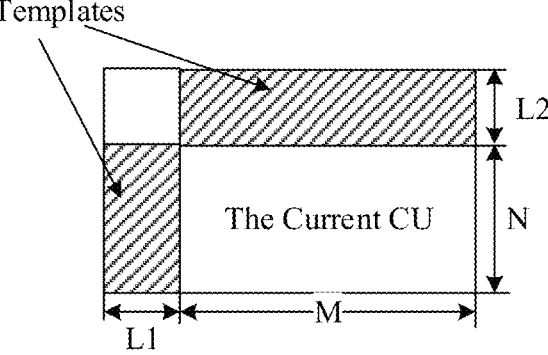
FIG. 5 is another example of an intra prediction mode.
FIG. 6 is a schematic diagram of a current CU and templates of the TIMD method.

In addition, there are also modes such as Plane, Planar and so on. As the technology develops and the block expands, the number of the angle prediction modes increases. For example, there are 35 intra prediction modes used in HEVC, including Planar, DC and 33 angle modes. Further, for example, as shown in FIG. 4, VVC has 67 intra prediction modes, and there are 65 angle prediction modes except mode 0 Planar and mode 1 DC. Planar is usually used to deal with gradual textures, DC is usually used to deal with flat regions, and intra angle prediction is usually used for blocks with obvious angle textures. With the angle prediction, reference pixels are tiled to the current block as prediction values in a specified angle. Of course, in VVC, wide-angle prediction mode may also be used for non-square blocks, and the wide-angle prediction mode makes the prediction angle larger than the angle range of square blocks. As shown in FIG. 5, 2 to 66 are angles corresponding to prediction modes of square blocks. −1 to −14 and 67 to 80 represent extended angles under wide-angle prediction modes. It is to be noted that the prediction mode stated here is a prediction mode of a single component, for example, the prediction mode of a single Y component. Cross-component prediction is introduced in VVC, i.e., inter-channel correlation is used, and therefore, the reconstructed value of the Y component may be used to predict the U and V components in the same block. The cross-component prediction modes are not included in the above modes.

In some embodiments, the decoder may determine the intra prediction mode used by the current block according to some flag information. In order to reduce the overhead of the flag information in the bitstream, the most probable mode (MPM) is introduced. The decoder may derive some MPMs according to the correlation between blocks. Since an MPM has a higher probability of being selected, it is usually possible to use shorter code words to indicate the description in an MPM, and use longer code words to indicate a non-MPM mode. An MPM usually uses the mode used by an adjacent block, for example, the description used by the left adjacent block or by the upper adjacent block. Due to spatial correlation, a mode used by an adjacent block may also be used in the current block. In addition, there are modes related to the modes of the adjacent blocks, such as modes with similar angles, for example, subtle texture changes occur between the current block and an adjacent block. Further, there are the most commonly-used modes, such as the planar mode.

In view of this, the TIMD method is proposed. FIG. 6 illustrates a schematic diagram of the current CU and templates of the TIMD method. As shown in FIG. 6, templates may be set adjacent to the current CU on the left and above, and regions of the templates have been decoded. For example, the size of the current CU is M*N, the size of the part of the template, which is on the left of the current CU, is L1*N, and the size of the part of the template, which is above the current CU, is M*L2. Since the template is adjacent to the current CU, they have a certain correlation. Therefore, the prediction effect of a certain intra prediction mode on the template may be used to estimate the prediction effect of the intra prediction mode on the current CU. In other words, if a prediction mode has a good prediction effect on the template, there is a high probability that the prediction mode also has a good prediction effect on the current CU.

The TIMD may determine one or two prediction modes to perform intra prediction on the current block. Exemplarily, in a case where two prediction modes are selected, the prediction values of the two prediction modes may be weighted by a certain ratio (i.e., weighting factors) to obtain the intra prediction value of the current block. However, in the current TIMD technology, the same weighting factor is set for each point of the current block. For a picture with complex textures, two prediction modes may have different prediction effects on different positions in the current block. For example, one of the modes has a good prediction effect on the left side of the current block, but has a poor prediction effect on the right side, while the other mode has a good prediction effect on the right side of the current block, but has a poor prediction effect on the left side. Therefore, there is an urgent need for a solution to improve the accuracy of intra prediction.

In view of this, an embodiment of the disclosure provides a intra prediction method. A template of the current block is divided into sub-templates, weighting factors of at least two prediction modes on a unit (for example, a sub-block, a part, a pixel point, or the like) of the current block are determined according to the sub-templates, and then an intra prediction value of the current block is determined according to the weighting factors of the at least two prediction modes on the unit of the current block. In the embodiment of the disclosure, the weighting factor of each of at least two prediction modes on different units of the current block may be determined, and thus different weighting factors may be set for different positional points in the current block. Therefore, the embodiment of the disclosure contributes to determining the intra prediction value of the current block more accurately, and thereby improving compression efficiency.

Figure 7:
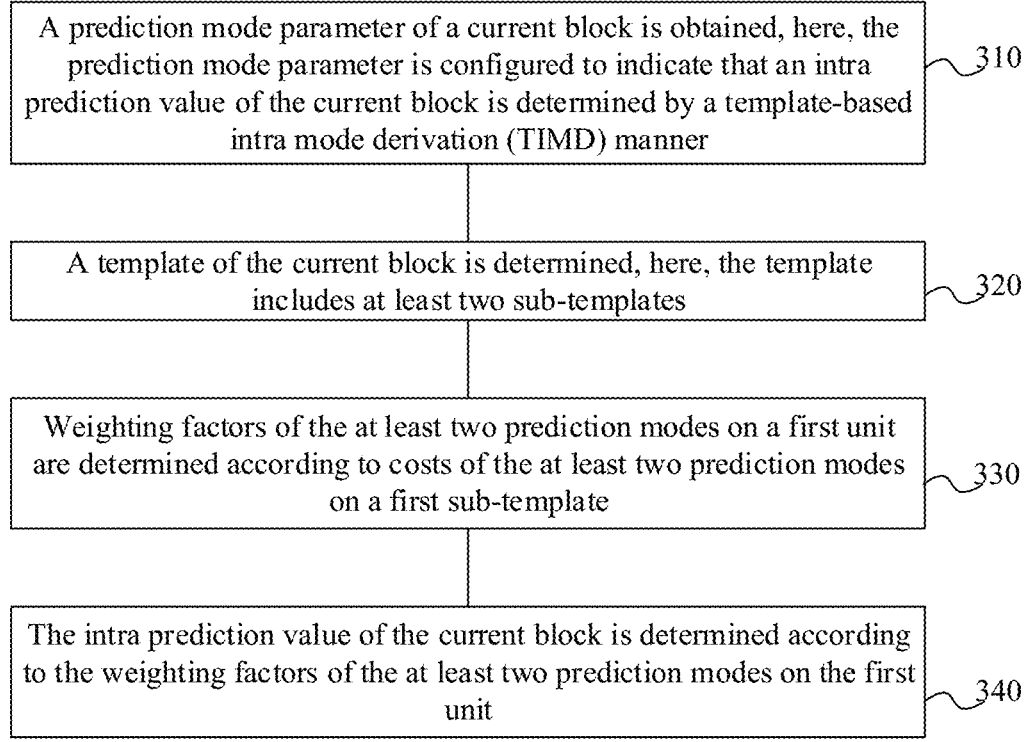
FIG. 7 is a schematic flowchart of an intra prediction method provided by an embodiment of the disclosure.

FIG. 7 illustrates a schematic flowchart of an intra prediction method 300 provided by an embodiment of the disclosure. The method 300 may be applied to an encoder, such as the encoder 100 in FIG. 1, or to a decoder, such as the decoder 200 in FIG. 2. In addition, the method 300 may be applied to the intra prediction unit 106 in the encoder 100, or to the intra prediction unit 204 in the decoder 200. As shown in FIG. 7, the method 300 includes operations 310 to 340.

In operation 310, a prediction mode parameter of a current block is obtained. The prediction mode parameter is configured to indicate that an intra prediction value of the current block is determined in template-based intra mode derivation (TIMD) manner.

In the embodiments of the disclosure, the current block may refer to a block that is currently being coded or a coding block, such as a CU, a PU, or the like, which is not limited. The current block may also be replaced with "coding block", "block", "current coding block", or the like, all of which may represent the same or similar meaning.

In some embodiments, in a case where the method 300 is applied to the coding side, the encoder may determine whether the current block uses the TIMD mode. Optionally, the encoder may transmit information indicating whether the current block uses the TIMD mode, i.e., a prediction mode parameter, in the bitstream. Exemplarily, the encoder may calculate the cost of using the TIMD mode, and the cost of other modes (for example, the cost of selecting a certain MPM mode, or the cost of selecting a certain non-MPM mode). If the cost of the TIMD mode is the smallest, it may be determined that the current block uses the TIMD mode to determine the intra prediction value of the current block. Otherwise, it is determined that the current block does not use the TIMD mode to predict the intra prediction value of the current block.

In some other embodiments, in a case where the method 300 is applied to the decoding side, the decoder may determine whether the current block uses the TIMD mode. For example, the decoder may obtain an input bitstream, and obtain information indicating whether the current block uses the TIMD mode, i.e., a prediction mode parameter, from the bitstream.

In the embodiment of the disclosure, the prediction mode parameter is configured to indicate that the current block uses the TIMD mode, that is, the intra prediction value of the current block is determined by the TIMD mode.

In operation 320, a template of the current block is determined. The template includes at least two sub-templates.

As an example, a template of the current block (which may also refer to as the entire template of the current block) may be determined, and the template is then divided into at least two sub-templates. For example, the entire template of the current block may be determined in the manner described above in FIG. 6, or the template of the current block may also be determined in other manners, for example, the left part, the upper part, and the left top part of the current block are all determined as the entire template of the current block, which is not limited by the disclosure.

As another example, at least two sub-templates may be determined as the template of the current block according directly to the position of the current block.

In some optional embodiments, the at least two sub-templates include at least one of a pixel block adjacent to the left side of the current block, a pixel block adjacent to the upper side of the current block, a pixel block at the left top of the current block, a pixel block at the left bottom of the current block, or a pixel block at the right top of the current block.

Figure 8:
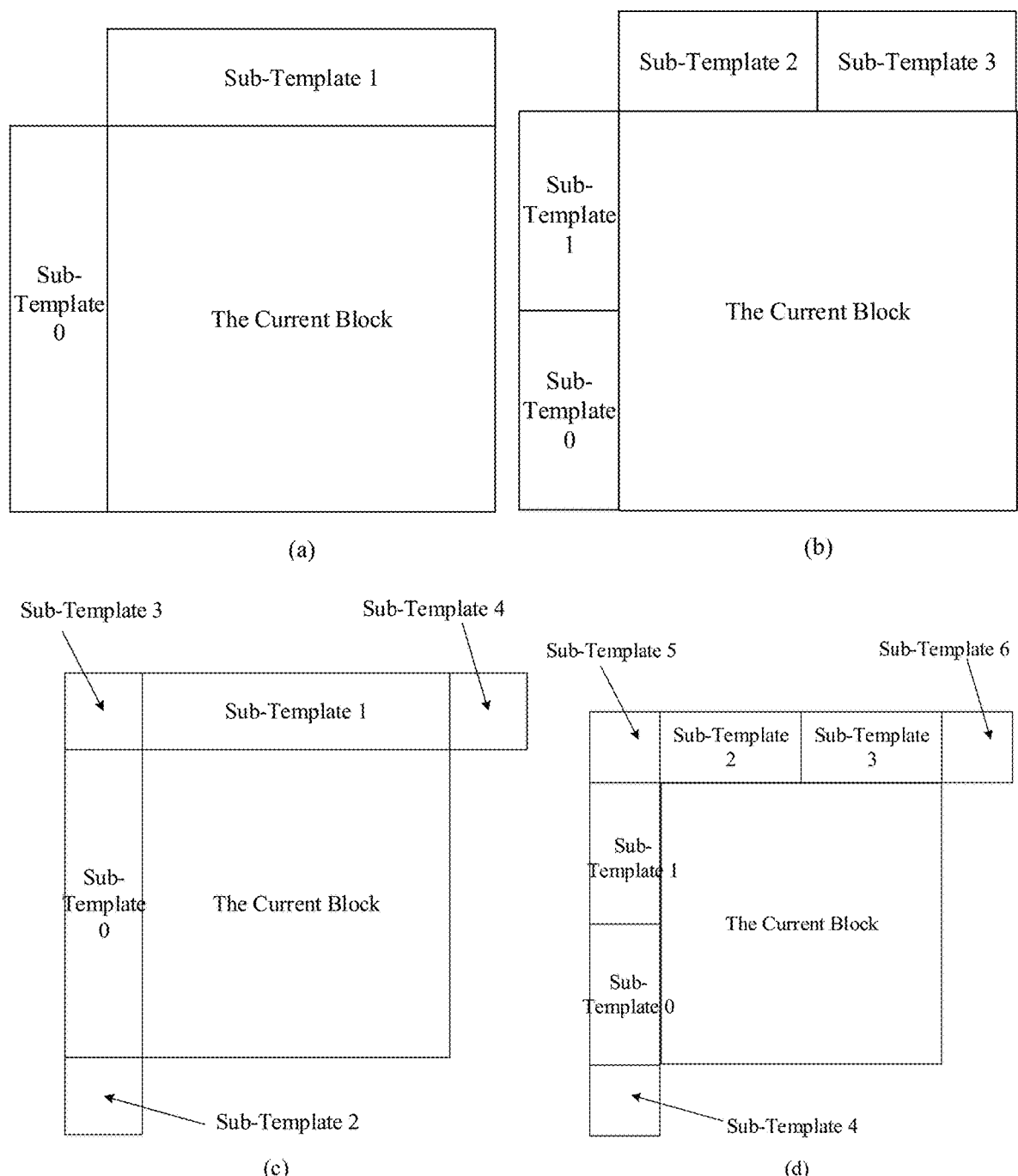
FIG. 8 is a specific example of sub-templates provided by an embodiment of the disclosure.

Exemplarily, the at least two sub-templates may belong to different parts of the template of the current block. As an example, the template of the current block may be determined according to the template shown in FIG. 6. Referring to FIG. 8, in (a), the template may be divided into 2 parts including sub-template 0 and sub-template 1. Sub-template 0 consists of pixels adjacent to the left side of the current block, and sub-template 1 consists of pixels adjacent to the upper side of the current block. In some examples, the sub-template on the left of the current block may be further divided, and/or, the sub-template above the current block may be further divided. For example, in (b) of FIG. 8, the template may include sub-template 0, sub-template 1, sub-template 2, and sub-template 3.

In addition, in the template shown in FIG. 6, only pixels adjacent to the left side and the upper side of the current block are used as the template. However, some pixel blocks, which are on the left top, the left bottom, the right top, or the like, of the current block, may also have a certain correlation with the current block, especially in a case where the texture of the current block presents some angles. Therefore, the pixel blocks on the left top, the left bottom, or the right top of the current block may also be taken as a part of the template.

Reference is further made to FIG. 8, with respect to the template in (a), the template in (c) may further include sub-template 2, sub-template 3 and sub-template 4. Sub-template 2 consists of some pixels on the left bottom of the current block, sub-template 3 consists of some pixels on the left top of the current block, and sub-template 4 consists of some pixels on the right top of the current block. With respect to the template in (b), the template in (d) may further include sub-template 4 on the left bottom of the current block, sub-template 5 on the left top of the current block, and sub-template 6 on the right top of the current block.

It is to be noted that the extended template in (c) may further be used directly in the existing TIMD method, which is not limited by the disclosure.

It is to be understood that FIG. 8 illustrates several specific examples of sub-templates provided by the disclosure, but it does not constitute any limitation of the disclosure. For example, the template may further include other coded or uncoded pixel parts. These pixel parts may be adjacent or not adjacent to the current block, which is not limited.

In some optional embodiments, the current block may be divided into at least two units. Exemplarily, the unit may be a sub-block, a part, or a pixel point. In the following description, the unit being a sub-block is taken as an example.

Figure 16:
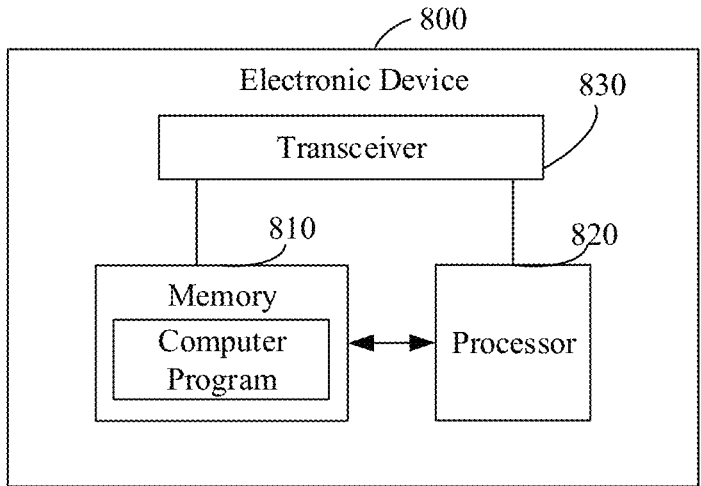
FIG. 16 is a schematic block diagram of an electronic device provided by an embodiment of the disclosure.

Exemplarily, assuming that the current block is square, the current block may be divided into 4 sub-blocks as shown in (a) of FIG. 9, or 16 sub-blocks as shown in (b) of FIG. 9, which is not limited. As shown in (a) of FIG. 9, the sub-block 0 includes pixels at the left top corner of the current block, sub-block 1 includes pixels at the right top corner of the current block, sub-block 2 includes pixels at the left bottom corner of the current block, and sub-block 3 includes pixels at the lower right corner of the current block. (b) of FIG. 9 is similar to (a) and will not be repeated.

It is to be understood that FIG. 9 illustrates two specific examples of sub-blocks provided by the embodiments of the disclosure, but it does not constitute any limitation of the disclosure. For example, the current block may also not be square, such as being rectangular, circular, trapezoidal, or irregularly shaped, or the current block may further be divided into other numbers of sub-blocks, which is not limited.

In some embodiments, the current block is divided into a fixed number of parts regardless of the size of the current block. In some other embodiments, the current block may be divided into different parts according to the size of the current block, for example, a smaller block (for example, 32×32, 16×16, 4×4, or the like) may be divided into 4 parts, and a larger block (for example, 128×128, 64×64, 32×32, or the like) may be divided into 16 parts. In some other embodiments, the current block may be divided into different parts according to the texture complexity of the current block, for example, a block with simple textures may be divided into 4 parts, and a block with complex textures may be divided into 16 parts.

It is to be noted that in the embodiments of the disclosure, the number of pixel points in a unit (for example, a sub-block, a part, or a pixel point) may be one, or multiple, which is not limited. In some embodiments, in a case where a unit includes one pixel point, the operation of dividing the current block into at least two units may not need to be executed.

In operation 330, a weighting factor of each of the at least two prediction modes on a first unit is determined according to respective costs of the at least two prediction modes on a first sub-template. Taking dividing the current block into at least one sub-block as an example, the first unit may, for example, be a first sub-block, the at least two sub-blocks include the first sub-block, and the at least two sub-templates include the first sub-template. The prediction mode may hereinafter be abbreviated as a mode.

In some optional embodiments, the at least two prediction modes may be at least two modes selected from the candidate modes, which have the smallest cost on the entire template of the current block.

Exemplarily, some candidate modes may be tried respectively on the entire template of the current block, and at least two modes with the smallest cost may be selected. The candidate modes may be modes in the MPM list, or some modes derived according to information of adjacent blocks, or modes derived from some other information, or all possible modes, which is not limited. In some embodiments, TIMD has extended the 67 intra prediction modes to 131 intra prediction modes, by which the angle of the angle prediction is more finely divided.

As an example, a cost may be calculated according to a Sum of Absolute Transformed Difference (SATD). As a specific example, it is assumed that mode 0 has the smallest cost on the entire template of the current block, and the smallest cost may be denoted as costMode0; mode 1 has the second smallest (i.e., the next smallest) cost on the entire template of the current block, and the second smallest (i.e., the next smallest) cost is denoted as costMode1, and so on. Optionally, at least two (for example, two, three, or another number) prediction modes that have the smallest cost on the entire template of the current block may be taken as the aforementioned at least two prediction modes.

In some optional embodiments, in a case where the difference in the costs corresponding to the at least two prediction modes is not large, the at least two prediction modes may be used simultaneously to determine the prediction value of the current block, for example, the prediction values of the at least two prediction modes may be weighted by a certain ratio. Conversely, in a case where the difference in the costs corresponding to the at least two prediction modes is too large, a part of the modes with a smaller cost may be used to determine the prediction value of the current block.

As a specific example, in a case where mode 0 and mode 1 are two modes with the smallest cost on the entire template of the current block respectively, it may be determined whether the following statement is satisfied.

$$costMode1 < 2*costMode0$$

If the statement is satisfied, the combination of mode 0 and mode 1 is used. Otherwise, only mode 0 is used.

In some other optional embodiments, the at least two prediction modes may be at least two modes selected from the candidate modes, which have the smallest cost on a part of the sub-templates of the current block.

Specifically, the embodiments of the disclosure support dividing the template of the current block into multiple parts (i.e., sub-templates), here, a spatially close point has a strong correlation, and a spatially distant point has a weak correlation. Taking dividing the template into the upper sub-template and the left sub-template (i.e., (a) in FIG. 8) as an example for description, in a case where some pixel points are close to the upper sub-template and far from the left sub-template, these points have strong correlations with the upper sub-template, that is, intra prediction modes that perform well on the upper sub-template are also more suitable for these pixel points. However, some intra prediction modes perform well on the upper sub-template and perform poorly on the left sub-template, which causes a poor performance of these modes on the entire template, and thus these modes may be discarded in the related art. However, in the embodiments of the disclosure, these intra prediction modes may be adopted.

Exemplarily, some candidate modes may be tried respectively on the sub-templates of the current block, for example, the mode with the smallest cost on each sub-template is selected as at least two prediction modes. The candidate modes or cost may refer to the description above and will not be repeated.

Figure 10:
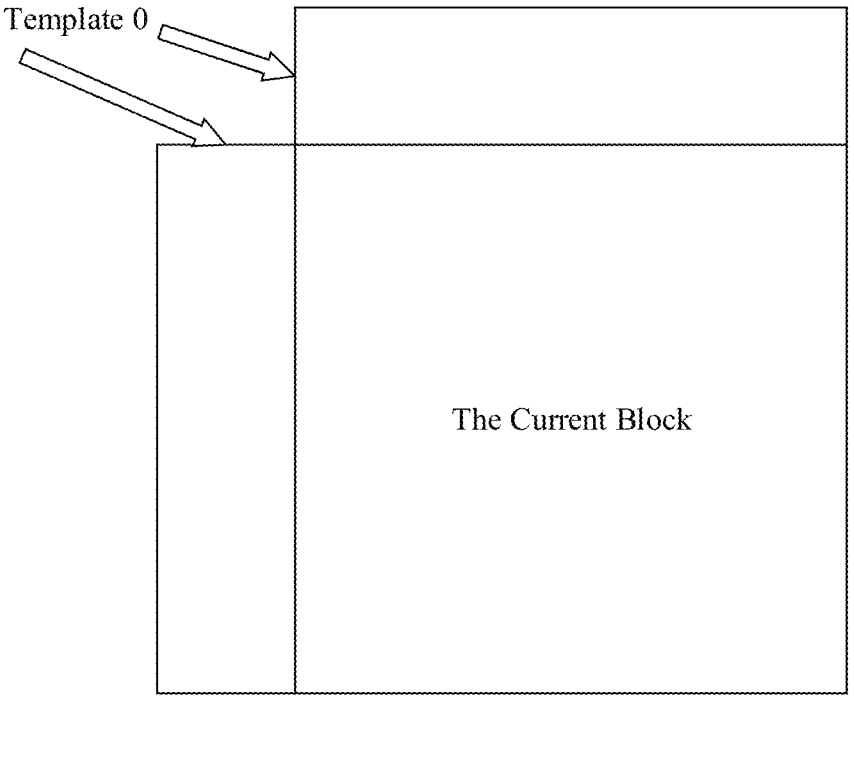
FIG. 10 is a specific example of sub-templates provided by an embodiment of the disclosure.

As a specific example, referring to FIG. 10, it is assumed that mode 0 has the smallest cost on the entire template (denoted as template 0) of the current block, and the smallest cost may be denoted as costMode0; mode 1 has the smallest cost on sub-template 1 of the current block, and the smallest cost may be denoted as costMode1Tem1; mode 2 has the smallest cost on sub-template 2 of the current block, and the smallest cost may be noted as costMode2Tem2. Optionally, the three modes, i.e., mode 0 with the smallest cost on the entire template of the current block, mode 1 with the smallest cost on sub-template 1, and mode 2 with the smallest cost on sub-template 2, may be taken as the aforementioned at least two prediction modes. In this way, one of the selected 3 modes (mode 0) performs best overall and the other two perform best locally, for example, mode 1 performs best on sub-template 1 and mode 2 performs best on sub-template 2.

In some optional embodiments, a mode that performs well on a local template (i.e., a mode with a smaller cost) does not necessarily perform well on the entire template, and thus some limitations may be further set when the at least two prediction modes are selected. For example, the cost of each of the at least two prediction modes on the entire template may be limited to not exceed a first value. Here, the first value is a preset threshold value, or the first value is an integer multiple, for example, twice, as much as the cost of the mode with the smallest cost on the template (i.e., mode 0) on the entire template (for example, costMode0), or otherwise, which is not limited.

As a specific example, in a case where mode 0, mode 1, and mode 2 are modes with the smallest cost on the entire template, sub-template 1, and sub-template 2, respectively, of the current block, the cost of mode 1 or mode 2 on the entire template may be further set as not exceeding twice as much as costMode0.

After the at least two modes are determined, a weighting factor of each of the at least two prediction modes on the first sub-block may be determined according to the respective costs of the at least two prediction modes on the first sub-template. Exemplarily, the first sub-template may be one of the at least one sub-template determined in the operation 320, and the first sub-block may be one of the at least one sub-block determined above. In other words, the weighting factors of at least two prediction modes at different positions of the current block may be calculated according to the costs of the at least two prediction modes on different sub-templates of the template.

In some optional embodiments, the first sub-template includes the sub-template, which is the closest to the first sub-block, of the at least two sub-templates. For example, the first sub-template may be adjacent to the first sub-block. In other words, in the embodiments of the disclosure, the prediction effect of a prediction mode on a corresponding adjacent part of the current block may be estimated according to the prediction effects of the prediction mode on different sub-templates of the template.

A process of determining a weighting factor of each of at least two prediction modes on the first sub-template according to the costs of the at least two prediction modes on the first sub-block is described below in conjunction with FIG. 11 by taking selecting two modes which have the smallest cost on the entire template of the current block as an example. It is to be understood that the embodiments of the disclosure may be extended to a case of a combination of more modes. In a case where more than two modes are selected, a weighting factor of each mode on the sub-block may be determined based on the same or similar manner as that of the case of two modes, which will not be repeated here.

As a specific example, referring to (a) of FIG. 11, where the sub-templates are, for example, the two sub-templates in (a) of FIG. 8, and the sub-blocks are, for example, the sub-blocks in (a) of FIG. 9. Taking (a) as an example, in the figure, the distances from sub-block 0 to sub-template 0 and to sub-template 1 may be regarded as the same, and the distances from sub-block 3 to sub-template 0 and to sub-template 1 may be regarded as the same. However, the distance from sub-block 1 to sub-template 1 is shorter than the distance from sub-block 1 to sub-template 0, and the distance from sub-block 2 to sub-template 0 is shorter than the distance from sub-block 2 to sub-template 1. Therefore, sub-block 1 may give a larger weighting factor to a mode that performs better on sub-template 1, and sub-block 2 may give a larger weighting factor to a mode that performs better on sub-template 0. Here, a mode performing well on a sub-template may be understood as the mode having a small cost on the sub-template, and a mode performing poorly may be understood as the mode having a large cost on the sub-template.

As an example, the aforementioned mode with the smallest cost on the entire template of the current block, which is denoted as mode 0, has a cost of costMode0 on the entire template, a cost of costMode0Tem0 on sub-template 0, and a cost of costMode0tem1 on sub-template 1. The aforementioned mode with the second smallest cost on the entire template of the current block, which is denoted as mode 1, has a cost of costMode1 on the entire template, a cost of costMode1Tem0 on sub-template 0, and a cost of costMode1Tem1 on sub-template 1.

Exemplarily, for sub-block 1 (an example of the aforementioned first sub-block), in a case of using a combination of two modes (i.e., mode 0 and mode 1), the weighting factor of each mode is calculated as shown in the following equations (1) and (2).

$$\text{weight0 Part 1} = \frac{\text{cost Mode 1}Tem1}{\text{cost Mode 0}Tem1 + \text{cost Mode 1}Tem1} \quad (1)$$

$$\text{weight1 Part 1} = 1 - \text{weight 0 Part 1} \quad (2)$$

Here, weight0Part1 is the weighting factor of mode 0 on sub-block 1, and weight1Part1 is the weighting factor of mode 1 on sub-block 1.

Similarly, for sub-block 2 (another example of the aforementioned first sub-block), in a case of using a combination of two modes (i.e., mode 0 and mode 1), the weighting factor of each mode is calculated as shown in the following equations (3) and (4).

$$weight0Part2 = \frac{costMode1Tem0}{costMode0Tem0 + costMode1Tem0} \quad (3)$$

$$weight1Part2 = 1 - weight0Part2 \quad (4)$$

Here, weight0Part2 is the weighting factor of mode 0 on sub-block 2, and weight1Part2 is the weighting factor of mode 1 on sub-block 2.

As can be seen, since sub-block 1 is closer to sub-template 1, the weighting factors of the two modes, i.e., mode 0 and mode 1, on sub-block 1 are determined according to the performance of the two modes on sub-template 1. Since sub-block 2 is closer to sub-template 0, the weighting factors of the two modes, i.e., mode 0 and mode 1, on sub-block 2 are determined according to the performance of the two modes on sub-template 1.

In some optional embodiments, a weighting factor of each of the at least two prediction modes on a second sub-block may further be determined according to the costs of the at least two prediction modes on the template (i.e., the entire template of the current block). Here, the second sub-block is a specific example of a second unit, and the aforementioned at least two sub-blocks include the second sub-block. As an example, the distances from the second sub-block to the at least two sub-templates are the same (or approximately the same).

Exemplarily, for sub-block 0 and sub-block 3 in (a) of FIG. 11 (a specific example of the aforementioned second sub-block), since the distances from sub-block 0 to sub-template 0 and to sub-template 1 may be regarded as the same, and the distances from sub-block 3 to sub-template 0 and to sub-template 1 may be regarded as the same, the weighting factors of the at least two prediction modes on sub-block 0 and sub-block 3 may be determined according to the costs of the mode 0 and mode 1 on the entire template (i.e., sum of sub-template 0 and sub-template 1). Here, mode 0 and mode 1 have the same weighting factor on sub-block 0 and sub-block 3.

In some optional embodiments, the weighting factor of each of the at least two prediction modes on the first sub-block may also be determined according to the costs of the at least two prediction modes on the first sub-template and the costs of the at least two prediction modes on the second sub-template. Here, the at least two sub-templates include the second sub-template.

Exemplarily, the distance from the first sub-template to the first sub-block may be shorter than the distance from the second sub-template to the first sub-block. In such case, the effect, of the costs of the at least two prediction modes on the first sub-template, on the weighting factor is greater than the effect, of the costs of the at least two prediction modes on the second sub-template, on the weighting factor. In other words, the shorter the distance from the sub-template to the sub-block, the greater the effect, of the cost of a prediction mode on the sub-template, on the weighting factor of the prediction mode on the sub-block is.

Reference is also made to the example in (a) of FIG. 11, the performance of the two modes, mode 0 and mode 1, on sub-template 0 may also be considered for the weighting factors of the two modes on sub-block 1, but the effect of the two modes on sub-template 1 is greater. The performance of the two modes, mode 0 and mode 1, on sub-template 1 may also be considered for the weighting factors of the two modes on sub-block 2, but the effect of the two modes on sub-template 0 is greater.

Exemplarily, for sub-block 1 (an example of the aforementioned first sub-block), in a case of using a combination of two modes (for example, mode 0 and mode 1), the weighting factor of each mode is calculated as shown in the following equations (5) and (6).

$$weight0Part1 = \frac{3*costMode1Tem1 + costMode1Tem0}{3*(costMode0Tem1 + costMode1Tem1) + costMode0Term0 + costMode1Term0} \quad (5)$$

$$weight1Part1 = 1 - weight0Part1 \quad (6)$$

Here, weight0Part1 is the weighting factor of mode 0 on sub-block 1, and weight1Part1 is the weighting factor of mode 1 on sub-block 1.

Similarly, for sub-block 2 (another example of the aforementioned first sub-block), in a case of using a combination of two modes (for example, mode 0 and mode 1), the weighting factor of each mode is calculated as shown in the following equations (7) and (8).

$$weight0Part2 = \frac{3ecostMode1Tem0 + costMode1Tem1}{3*(costMode0Tem0 + costMode1Tem0) + costMode0Tem1 + costMode1Tem1} \quad (7)$$

$$weight1Part2 = 1 - weight0Part2 \quad (8)$$

Here, weight0Part2 is the weighting factor of mode 0 on sub-block 2, and weight1Part2 is the weighting factor of mode 1 on sub-block 2.

In other words, in the above example, a weighting factor of 1:3 or 3:1 is used to weight the costs of the two sub-templates.

In some optional embodiments, the weighting factor of each of the at least two prediction modes on the first sub-block may also be determined according to the costs of the at least two prediction modes on the first sub-template and the cost of the prediction mode on the template (i.e., the entire template of the current block).

Continuing with the example in (a) of FIG. 11, the performance of the two modes, mode 0 and mode 1, on the entire template of the current block may also be considered for the weighting factors of the two modes on sub-block 1. Optionally, the effect of the two modes on the sub-template may be greater than the effect of the two modes on the entire template or less than the effect of the two modes on the entire template, which is not limited.

Exemplarily, for sub-block 1, in a case of using a combination of two modes (for example, mode 0 and mode 1), the weighting factor of each mode is calculated as shown in the following equations (9) and (10).

$$weight0Part1 = \frac{3*costMode1Tem1 + costMode1}{3*(costMode0Tem1 + costMode1Tem1) + costMode0 + costMode1} \quad (9)$$

$$weight1Part1 = 1 - weight0Part1 \quad (10)$$

Similarly, the weighting factors of mode 0 and mode 1 on sub-block 2 may refer to the calculation process of the weighting factors of mode 0 and mode 1 on sub-block 1, and the weighting factors of mode 0 and mode 1 on sub-block 0 and sub-block 3 may refer to the calculation process of the weighting factors of mode 0 and mode 1 on sub-block 0 and sub-block 3 in (a) of FIG. 11, which will not be repeated.

In other words, in the above example, a weighting factor of 1:3 or 3:1 is used to weight the costs of sub-template 1 and the entire template.

In some optional embodiments, the template of the current block may be divided into more sub-templates, such as 4 sub-templates, or 16 sub-templates. In this way, performance of a mode on a finer-grained template may be obtained, which enables the weighting factor to be calculated with reference to more information, and thereby contributes to determining the weighting factor of each mode on each sub-block more finely.

In some optional embodiments, the current block may be divided into more sub-blocks, such as 16 sub-blocks, 32 sub-blocks, or the like. In this way, the current block may be divided in a finer-grained manner, which enables the calculation of weighting factors on finer-grained sub-blocks, and thereby contributes to determining the weighting factor of each mode on each sub-block more finely.

As a specific example, referring to (b) of FIG. 11, where the sub-templates are, for example, the four sub-templates in (b) of FIG. 8, and the sub-blocks are, for example, the sub-blocks in (a) in FIG. 9. Similarly to (a) of FIG. 11, the distances from sub-block 0 and sub-block 3 to each sub-template may be regarded as the same, and the weighting factor of each of the at least two prediction modes on sub-block 0 and sub-block 3 may be determined according to the costs of the at least two prediction modes on the template (i.e., the entire template of the current block). For sub-block 1 and sub-block 2, the weighting factor of each of the at least two prediction modes on sub-block 1 and sub-block 2 may be determined according to the costs of the at least two prediction modes on sub-templates 0 to 3.

As an example, mode 0, which is the aforementioned mode with the smallest cost on the entire template of the current block, has a cost of costMode0 on the entire template, and a cost of costMode0TemX on template X, where X is 0, 1, 2, or 3. Mode 1, which is the mode with the second smallest cost on the entire template of the current block, has a cost of costMode1 on the entire template, and a cost of costMode1 TemX on template X.

Exemplarily, for sub-block 1, in a case of using a combination of two modes (i.e., mode 0 and mode 1), the weighting factor of each mode is calculated as shown in the following equations (11) and (12).

$$weight0Part1 = \frac{A}{B} \tag{11}$$

where A=4*costMode1Tem3+3*costMode1Tem2+ 2*costMode1Tem1+costMode1Tem0, and B=4* (costMode0Tem3+costMode1Tem3)+3* (costMode0Tem2+costMode1Tem2)+2* (costMode0Tem1+costMode1Tem1)+ (costMode0Tem0+costMode1Tem0).

$$weight1Part1 = 1 - weight0Part1 \tag{12}$$

Similarly, the weighting factors of mode 0 and mode 1 on sub-block 2 may refer to the calculation process of the weighting factors of mode 0 and mode 1 on sub-block 1, and the weighting factors of mode 0 and mode 1 on sub-block 0 and sub-block 3 may refer to the calculation process of the weighting factors of mode 0 and mode 1 on sub-block 0 and sub-block 3 in (a) of FIG. 11, which will not be repeated.

It is to be noted that in the embodiments of the disclosure, the maximum value of the calculated weighting factor cannot exceed 1. In a case where a calculated weighting factor is greater than 1, the value of the weighting factor is required to be clipped to 1.

As another specific example, referring to (c) of FIG. 11, where the sub-templates and the current block are more finely divided. For example, the current block is divided into a number of sub-blocks by a size of 4×4, correspondingly, the template on the left is divided into sub-templates by a size of L1*4, and the template above is also divided into sub-templates by a size of 4*L2. Specifically, for example, in (c) of FIG. 11, the current block is a 16×16 block, and the current block may be divided into 16 sub-blocks by a size of 4×4. The template is correspondingly divided into 8 sub-templates, which, for example, may be denoted as Tem0 to Tem8 in the figure.

As an example, in a case of calculating a weighting factor of a prediction mode on a sub-block in (c) of FIG. 11, one or more closest sub-templates in the horizontal and vertical directions corresponding to the current sub-block may be used. For example, for sub-block 6 in (c) of FIG. 11, the three closest sub-templates in the horizontal direction, such as Tem1, Tem2, and Tem3, and the three closest sub-templates in the vertical direction, such as Tem5, Tem6, and Tem7, may be used. Specifically, the way of calculating the weighting factor of each of the at least two modes on each sub-block may refer to the above descriptions, and will not be repeated here.

In some optional embodiments, in a case where a prediction mode has a smallest cost on the first sub-template of the current block, the prediction mode may be set to have larger weighting factors on sub-blocks or points closer to the first sub-template, and have smaller weighting factors, or even 0, on positions far away from the first sub-template. For example, referring to FIG. 10, in a case where mode 0 performs best on the entire template, mode 1 performs best on sub-template 1, and mode 2 performs best on sub-template 2, the weighting factors of mode 2 from top to bottom on the current block may be set as from large to small, and the weighting factors of mode 1 from left to right on the current block may be set as from large to small. For example, in a case of dividing the current block into four sub-blocks, the weighting factors of mode 2 on the top two sub-blocks (for example, sub-block 0 and sub-block 1) are not 0, and the weighting factors of mode 2 on the bottom two sub-blocks (for example, sub-block 2 and sub-block 3) are 0; the weighting factors of mode 1 on the left two sub-blocks (sub-block 0 and sub-block 2) are not 0, and the weighting factors of mode 1 on the right two sub-blocks (for example, sub-block 1 and sub-block 3) are 0.

It is to be noted that in a case where the cost of a mode on a sub-template is too large, the weighting factor of the mode on the sub-template may be set as 0. Exemplarily, in a case where the cost of mode 1 on sub-template 1 is greater than twice as much as the cost of mode 0 on sub-template 1, it may be determined that the cost of mode 1 on sub-template 1 is too large.

In operation 340, the intra prediction value of the current block is determined according to the weighting factors of the at least two prediction modes on the first unit.

Exemplarily, taking the case where the first unit is the first sub-block as an example, in a case where a first pixel point is located in sub-block N (an example of the first sub-block)

of the current block, the intra prediction value of the first pixel point may be the sum of the product of the intra prediction value of each mode at a first position and the weighting factor of the mode on sub-block N. Here, N is an integer greater than or equal to 0. For example, in a case of dividing the current block into 4 sub-blocks, N=0, 1, 2, or 3.

As a specific example, the aforementioned first pixel point may be denoted as (x, y). In a case where the at least two prediction modes are mode 0 and mode 1, it may be assumed that the prediction value of mode 0 at the position of (x, y) is pred0XY, and the prediction value of mode 1 at the position of (x, y) is pred1XY. Then, the prediction value predXY at (x, y) may be denoted as the following equation (13).

$$\text{pred}XY = \text{pred}0XY * \text{weight}0\text{Part}N + \text{pred}1XY * \text{weight}1\text{Part}N \tag{13}$$

In a case of determining the weighting factor of each of the at least two prediction modes on a second unit according to the costs of the at least two prediction modes on the template, the operation 340 may specifically be determining the intra prediction value of the current block according to the weighting factors of the at least two prediction modes on the first unit, and the weighting factors of the at least two prediction modes on the second unit.

Specifically, taking the case where the unit includes sub-blocks as an example, the way of determining the intra prediction value at a position in sub-block N may refer to the aforementioned description. For a second pixel point in sub-block M (an example of the second sub-block), the prediction value may be the sum of the product of the prediction value of each mode at the second pixel point and the weighting factor of the mode on sub-block M. Here, M is an integer greater than or equal to 0, and N is not equal to M. Similarly, it is possible to refer to the description of the above equation 13. Unlike the process of determining the prediction value of the first pixel point, the weighting factor of each prediction mode at the second pixel point is determined in a different manner than the weighting factor of each prediction mode at the first pixel point.

In some embodiments, for example, in a practical implementation, in order to avoid the use of decimals, a scaling and normalization method may be used. For example, the weighting factors may all be scaled up 8 times. To achieve a rounding-like effect, an offset value may be added and the final prediction value may then be shifted to the right by 3 bits.

Therefore, in the embodiments of the disclosure, at least two sub-templates of the current block are determined, and thus the weighting factor of each of the at least two prediction modes on the first unit of the current block may be determined according to the costs of the at least two prediction modes on the sub-templates. In addition, the prediction value of the current block may be determined according to the weighting factors. In the embodiments of the disclosure, the weighting factor of each of the at least two prediction modes on different units of the current block may be determined, and thus it is possible to realize setting different weighting factors for different points of the current block, which contributes to determining the intra prediction value of the current block more accurately, and thereby improving compression efficiency.

It is to be noted that in the embodiments of the disclosure, the first unit and the second unit may respectively be different pixel points in the current block, pixel points in different sub-blocks of the current block, or pixel points in different parts of the current block, which is not limited. In other words, in the embodiments of the disclosure, the weighting factors may be calculated in terms of points (i.e., pixel points), in terms of sub-blocks, or in terms of parts, which is not limited. In other words, in the embodiments of the disclosure, the granularity of calculating weighting factors may be in terms of points, in terms of sub-blocks, or in terms of parts, which is not limited.

Exemplarily, by calculating the weighting factors of the prediction modes on each unit (for example, sub-block, part, or pixel point) of the current block, it is possible to give a larger weighting factor to a mode with better performance and give a smaller weighting factor to a mode with poor performance as much as possible on a unit, that is, to set a larger weighting factor for a mode on positions (for example, sub-blocks, parts, or pixel points) where the mode has a good prediction effect, and to set a smaller weighting factor for the mode on positions where the mode has a poor prediction effect, which makes more sense than a method of setting uniform weighting factors on the entire current block, and thus enables the production of prediction blocks with more complex textures.

The solutions of the embodiments of the disclosure may be applied to scenarios with complex textures, such as scenarios with distorted lines, uneven surfaces, or the like. In other words, in such scenarios with more complex textures, in the embodiments of the disclosure, intra prediction is directly performed, instead of encoding more residuals or dividing smaller blocks to make the texture within a single block simpler, and thus the embodiments of the disclosure may contribute to complex prediction by using as few flag bits as possible, and thereby improving compression efficiency.

In some optional embodiments, after intra prediction is performed according to the aforementioned method 300, the aforementioned at least two prediction modes have different weighting factors at junctions between various units (for example, sub-blocks, parts, pixel points, or the like) of the current block, which may result in the prediction block of the current block appearing to be bounded at junctions of some units. As a possible processing method, a smoothing filtering process may be performed after the prediction value of each mode is weighted according to the weighting factors, for example, an operation similar to de-blocking effect filtering. As another possible processing method, a certain algorithm may be used to ensure that the change between weighting factors of adjacent parts are not too large. As another possible processing method, in the process of calculating the weighting factor of each mode on each part, the current block may be divided into finer granularity, for example, a weighting factor is calculated for each 4×4 sub-block, or a weighting factor is calculated for each pixel point, so as to ensure that the change between weighting factors of adjacent units are not too large.

Optionally, when the current block is divided into finer granularity, more sub-templates may be divided, so as to match the granularity of the calculation of weighting factors better. For example, referring to the example shown in (b) of FIG. 11, the current block may be divided into two blocks in the horizontal direction and two blocks in the vertical direction, that is, the current block is totally divided into four sub-blocks. Correspondingly, the template on the left may also be divided into two blocks, i.e., sub-template 0 and sub-template 1 as shown in the figure, and the template above may also be divided into two blocks, i.e., sub-template 2 and sub-template 3 as shown in the figure. In this way, performance of a certain mode on a finer-grained template may be obtained, and further, the weighting factor may be calculated with reference to more information.

In addition, an embodiment of the disclosure further provides an intra prediction method. After the weighting factor of each of at least two prediction modes on at least two units (for example, sub-blocks, parts, or pixel points, or the like) of the current block are determined, a change rate of the weighting factors in a first direction (for example, the vertical direction or the horizontal direction) may be further determined according to the weighting factors of the at least two units, and then weighting factors on other units of the current block may be determined according to the change rate by a smooth transition manner, so as to determine the intra prediction value of the current block. In the embodiment of the disclosure, the weighting factor of each of at least two prediction modes on different units of the current block may be determined, and thus different weighting factors may be set for different positions in the current block. Therefore, the embodiment of the disclosure contributes to determining the intra prediction value of the current block more accurately, and thereby improving compression efficiency.

FIG. 12 illustrates a schematic flowchart of another intra prediction method 400 provided by an embodiment of the disclosure. The method 400 may be applied to an encoder, such as the encoder 100 in FIG. 1, or to a decoder, such as the decoder 200 in FIG. 2. In addition, the method 400 may be applied to the intra prediction unit 106 in the encoder 100, or to the intra prediction unit 204 in the decoder 200. As shown in FIG. 12, the method 400 includes operations 410 to 340.

In operation 410, a prediction mode parameter of a current block is obtained. The prediction mode parameter is configured to indicate that an intra prediction value of the current block is determined in template-based intra mode derivation (TIMD) manner.

Specifically, the operation 410 may refer to the description of the operation 310 in the method 300, which will not be repeated here.

In operation 420, a first weighting factor of each of at least two prediction modes on a first unit of the current block, and a second weighting factor on a second unit are determined. Here, the first unit and the second unit have different coordinates in a first direction.

In some optional embodiments, the at least two prediction modes are determined according to the costs of the candidate modes on the template (i.e., the entire template) of the current block, and/or, according to the costs of the candidate modes on one or more sub-templates of the template.

Optionally, in a case where the at least two prediction modes are determined according to the costs of the candidate modes on a part of the at least two sub-templates, the cost of each of the at least two prediction modes on the template does not exceed a first value. Here, the first value is a preset threshold value, or the first value is twice as much as a first prediction mode, and the first prediction mode is the smallest mode on the template.

Exemplarily, the at least two prediction modes may include two prediction modes, three prediction modes, or more, which is not limited. Specifically, the manner of determining the prediction modes may refer to the description in the operation 340 in FIG. 7, which will not be repeated here.

Exemplarily, the first unit and the second unit may respectively be different pixel points in the current block, pixel points in different sub-blocks of the current block, or pixel points in different parts of the current block, which is not limited. Optionally, in a case where the first unit and the second unit are pixel points in different parts or different sub-blocks, the method 400 further includes the following operation: the current block is divided into at least two sub-blocks or at least two parts. In other words, in the embodiments of the disclosure, the weighting factors may be calculated in terms of points (i.e., pixel points), in terms of sub-blocks, or in terms of parts, which is not limited. In other words, in the embodiments of the disclosure, the granularity of change of the weighting factors may be in terms of points, in terms of sub-blocks, or in terms of parts, which is not limited.

In some embodiments, the first weighting factors of the at least two prediction modes on the first unit of the current block, and the second weighting factors on the second unit may be determined according to the method 300, which may specifically refer to the description in the method 300, and will not be repeated here. In some other embodiments, the weighting factors of the first unit and the second unit of the current block may also be determined according to other methods, which are not limited by the disclosure.

In some optional embodiments, the method 400 may further include the following operation. A third weighting factor of each of the at least two prediction modes on a third unit of the current block is determined. Here, the first unit and the third unit have different coordinates in a second direction, and the second direction is perpendicular to the first direction.

Exemplarily, the third unit may be pixel points in the current block which are different from the first unit and the second unit, or pixel points in a sub-block different from the first unit and the second unit, or pixel points in a part different from the first unit and the second unit, which is not limited.

Exemplarily, the first direction may be the vertical direction, and the second direction may be the horizontal direction, which is not limited.

Specifically, the third weighting factors of the at least two prediction modes on the third unit of the current block may be determined according to the method 300, or other manners, which is not limited.

In some optional embodiments, the first unit may be located at the left top corner of the current block, the second unit may be located at the left bottom corner of the current block, and the third unit may be located at the right top corner of the current block. Referring to (a) of FIG. 13, as an example, the current block has a size of M×N. The first unit may be located at the left top corner (denoted as LT), and the coordinates may be denoted as (0, 0). The second unit may be located at the left bottom corner (denoted as LB), and the coordinates may be denoted as (0, N−1). The third unit may be located at the right top corner (denoted as RT), and the coordinates may be denoted as (M−1, 0).

In some other optional embodiments, the first unit may be located at the left top corner of the current block, the second unit may be located at the left middle side of the current block, and the third unit may be located at the middle upper side of the current block. Referring to (b) of FIG. 13, as an example, the current block has a size of M×N. The first unit may be located at the left top corner (denoted as LT), and the coordinates may be denoted as (0, 0). The second unit may be located at the left middle side (denoted as LM), and the coordinates may be denoted as (0, N/2). The third unit may be located at the middle upper side (denoted as MU), and the coordinates may be denoted as (M/2, 0).

It is to be noted that in the embodiments of the disclosure, all coordinates are coordinates relative to the left top corner of the current block. In other words, in the embodiments of the disclosure, the coordinates at the left top corner are denoted as (0, 0) in a local scope (i.e., within the current block).

As a specific example, the two modes with the smallest cost on the entire template of the current block, for example, mode 0 and mode 1, are selected. Referring to (a) of FIG. 13, the weighting factor of mode 0 at the left bottom corner may be denoted as weight0LB, the weighting factor at the left top corner may be denoted as weight0LT, and the weighting factor at the right top corner may be denoted as weight0RT. Exemplarily, the template of the current block is divided into sub-template 0, sub-template 1, sub-template 2 and sub-template 3, and then the weighting factors of mode 0 at the above three positions may be as shown in the following equations (14)-(16).

$$weight0LT = \frac{costMode1Tem1 + costMode1Tem2}{\begin{array}{c}costMode0Tem1 + costMode1Tem1 + \\ costMode0Tem2 + costMode1Tem2\end{array}} \quad (14)$$

$$weight0LB = \frac{costMode1Tem0}{costMode0Tem0 + costMode1Tem0} \quad (15)$$

$$weight0RT = \frac{costMode1Tem3}{costMode0Tem3 + costMode1Tem3} \quad (16)$$

Exemplarily, the weighting factor of mode 1 at each of the above three positions is 1 minus the weighting factor of mode 0.

As another specific example, the mode with the smallest cost on the entire template of the current block and the mode with the smallest cost on the sub-template are selected. Referring to FIG. 10, for example, mode 0 is the mode with the smallest cost on the entire template, mode 1 is the mode with the smallest cost on sub-template 1, and mode 2 is the mode with the smallest cost on sub-template 2. The weighting factor at each position may be calculated according to the costs of the modes on respective templates. It is assumed that the cost of mode X on sub-template Y is costModeX-temY, where X takes values in the range of 0, 1, or 2, and Y takes values in the range of 0, 1, or 2. Referring to (a) and (b) of FIG. 13, the position at the left top corner, LT, may be denoted as pos0, the position at the left bottom corner, LB, or at the middle-right side, LU, may be denoted as pos1, and the position at the right top corner, RT, or at the middle upper side, MU, may be denoted as pos2. Then, the weighting factor of Mode X at posZ (Z takes values in the range of 0, 1, or 2) may be denoted as weightXposZ.

The weighting factor of each of the three modes at posZ is as shown in the following equations.

$$weight1PosZ = \quad (17)$$
$$\frac{costMode0TemZ + costMode2TemZ}{2*(costMode0TemZ + costMode1TemZ + costMode2TemZ)}$$

$$weight2PosZ = \quad (18)$$
$$\frac{costMode0TemZ + costMode1TemZ}{2*(costMode0TemZ + costMode1TemZ + costMode2TemZ)}$$

$$weight0PosZ = 1 - weight1PosZ - weight2PosZ \quad (19)$$

Here, TemZ represents the template (or sub-template) corresponding to posZ. For example, for pos0, TemZ is the entire template, for example, template 0. For pos1, TemZ is sub-template 1 that is the closest (for example, adjacent) to pos1, and for pos2, TemZ is sub-template 2 that is the closest (for example, adjacent) to pos2.

In operation 430, a first change rate of each of the at least two prediction modes in the first direction is determined according to the first weighting factor, the second weighting factor, the coordinates of the first unit, and the coordinates of the second unit.

In other words, the change rate of the prediction mode in the first direction may be determined according to the weighting factors and coordinates of the first unit and the second unit. Exemplarily, in a case where the first unit and the second unit are pixel points, the first direction may be the direction of the line where the first unit and the second unit are located. In a case where the first unit and the second unit are sub-blocks or parts, the first direction may be the direction of the line where the center of the first unit and the center of the second unit are located. As a specific example, in (a) and (b) of FIG. 13, the first direction is the vertical direction.

In some optional embodiments, a second change rate of each of the at least two prediction modes in the second direction may further be determined according to the first weighting factor, the third weighting factor, the coordinates of the first unit, and the coordinates of the third unit.

Exemplarily, in a case where the first unit and the third unit are pixel points, the second direction may be the direction of the line where the first unit and the third unit are located. In a case where the first unit and the third unit are sub-blocks or parts, the second direction may be the direction of the line where the center of the first unit and the center of the third unit are located. As a specific example, in (a) and (b) of FIG. 13, the second direction is the horizontal direction.

Optionally, a linear model (for example, a primary function) or a non-linear model (for example, a quadratic function, a cubic function, or the like) may be adopted to derive the change rate of the weighting factor in the first direction or the second direction. In other words, in a case where the weighting factor is considered to be uniformly varying from point to point (or between sub-blocks or parts), a linear model may be adopted to calculate the change rate of the weighting factor in the first direction or the second direction. On the other hand, the adoption of the linear model may reduce calculation complexity.

Figure 13:
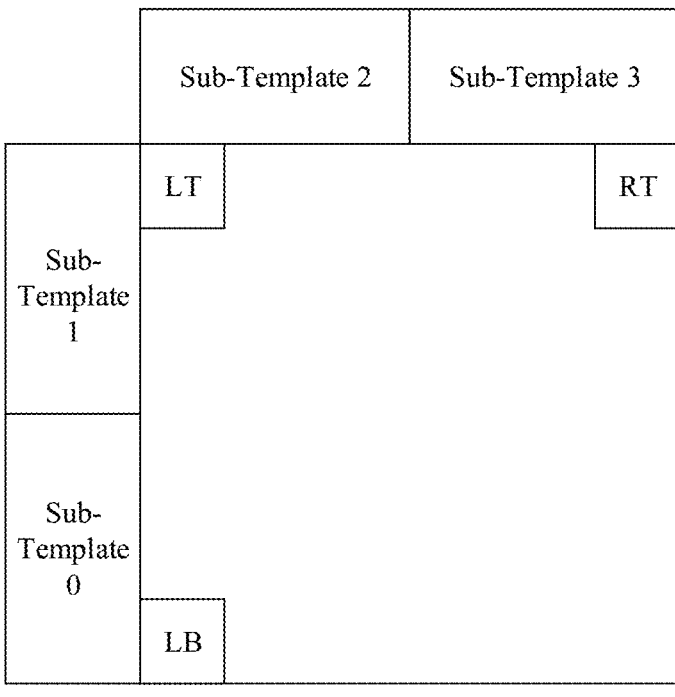
FIG. 13 is a specific example of three units in a current block provided by an embodiment of the disclosure.

As a specific example, referring to (a) of FIG. 13, in a case where a linear model is adopted to calculate the first change rate of the weighting factor in the vertical direction, the first change rate of mode 0 in the vertical direction may be denoted as the following equation (20).

$$\frac{weight0LB - weight0LT}{N - 1} \quad (20)$$

In a case where a linear model is adopted to calculate the second change rate of the weighting factor in the horizontal direction, the second change rate of mode 0 in the horizontal direction may be denoted as the following equation (21).

$$\frac{weight0RT - weight0LT}{M - 1} \quad (21)$$

As another specific example, referring to (b) of FIG. 13, in a case where a linear model is adopted to calculate the first change rate of the weighting factor in the vertical direction, the first change rate of mode 0 in the vertical direction may be denoted as the following equation (22).

$$\frac{2(weight0LM - weight0LT)}{N} \tag{22}$$

In a case where a linear model is adopted to calculate the second change rate of the weighting factor in the horizontal direction, the second change rate of mode 0 in the horizontal direction may be denoted as the following equation (23).

$$\frac{2(weight0MU - weight0LT)}{M} \tag{23}$$

In operation 440, a fourth weighting factor of each of the at least two prediction modes on a fourth unit is determined according to the first change rate and the coordinates of the fourth unit.

Exemplarily, in a case where the fourth unit is a pixel point, the coordinates of the fourth unit may be denoted as (x, y). As a specific example, the fourth unit may be a pixel point on the same line as the first unit and the second unit, and in such case, the weighting factor of each of the at least two prediction modes on the fourth unit may be determined according to the first change rate and the coordinates of the fourth unit.

In some optional embodiments, the fourth weighting factor may be determined according to the first change rate, the second change rate and the coordinates of the fourth unit. Here, the fourth unit may be any unit of the current block.

As a specific example, continuously referring to (a) of FIG. 13, in a case where the first change rate is denoted as the equation (20), the second change rate is denoted as the equation (21), and the fourth unit is denoted as (x, y), the weighting factor of mode 0 on the fourth unit, weight0XY, may be as shown in the equation (24).

$$weight0XY = \\ \frac{weight0RT - weight0LT}{M-1}x + \frac{weight0LB - weight0LT}{N-1}y + weight0LB \tag{24}$$

It is to be noted that in the equations (20), (21) and (24), (M−1) or (N−1) is used as the denominator. In the field of video encoding and decoding, M and N are generally an integer power of 2, for example, 4, 8, 16, 32, or the like. In such case, the operation of dividing by M or N may be processed by a right shift, which is hardware friendly. In some optional implementations, the denominator (M−1) in the equations (20), (21) and (24) may be replaced with M and (N−1) with N. In other words, the coordinates of the left bottom corner in (a) of FIG. 13 may be replaced with (0, N), and the coordinates of the right top corner may be understood as (M, 0), so as to make the calculation simple. In such case, it is to be understood that the points at the left bottom corner and at the right top corner are not on integer pixel points.

In some embodiments, in a case where the granularity of the calculation of weighting factors is a sub-block, a part, or a pixel point, an appropriate sub-block, part, or pixel point may be selected such that the denominator in the equation of the change rate is an integer power of 2, which is not limited by the disclosure.

As another specific example, continuously referring to (b) of FIG. 13, in a case where the first change rate is denoted as the equation (22), the second change rate is denoted as the equation (23), and the fourth unit is denoted as (x, y), the weighting factor of mode 0 on the fourth unit, weight0XY, may be as shown in the equation (25).

$$weight0XY = \frac{2(weight0MU - weight0LT)}{M}x + \\ \frac{2(weight0LM - weight0LT)}{N}y + weight0LB \tag{25}$$

It is to be noted that the maximum value of the value of the weighting factor calculated by the equation (24) or (25) cannot exceed 1. In a case where a calculated weighting factor is greater than 1, the value is required to be clipped to 1. In addition, for each unit, the weighting factor of mode 1, weight1XY, takes the value of 1 minus weight0XY, i.e., weight1XY=1−weight0XY.

In operation 450, the intra prediction value of the current block is determined according to the first weighting factors, the second weighting factors and the fourth weighting factors.

In other words, the intra prediction value of the current block may be determined according to the weighting factors of at least two prediction modes on units (for example, sub-blocks, parts, pixel points, or the like) of the current block. Exemplarily, for each unit, the intra prediction value is the sum of the product of the intra prediction value of each mode on the unit and the weighting factor of the mode on the unit.

Continuing with the example in FIG. 13, for (a) and (b), the prediction value at (x, y), predXY, may be denoted as the following equation (26).

$$predXY = pred0XY * weight0XY + pred1XY * weight1XY \tag{26}$$

In some embodiments, for example, in a practical implementation, in order to avoid the use of decimals, a scaling and normalization method may be used. For example, the weighting factors may all be scaled up 8 times. To achieve a rounding-like effect, an offset value may be added and the final prediction value may then be shifted to the right by 3 bits.

Therefore, in the embodiments of the disclosure, after the weighting factor of each of at least two prediction modes on at least two units (for example, sub-blocks, parts, pixel points, or the like) of the current block are determined, a change rate of the weighting factor in a certain direction (for example, the vertical direction or the horizontal direction) may be further determined according to the weighting factors on the at least two units, and then weighting factors on other units of the current block may be determined according to the change rate by a smooth transition manner, so as to determine the intra prediction value of the current block. In the embodiments of the disclosure, the weighting factor of each of at least two prediction modes on different units of the current block may be determined, and thus it is possible to realize setting different weighting factors for different points of the current block, which contributes to determining the intra prediction value of the current block more accurately, and thereby improving compression efficiency.

The solutions of the embodiments of the disclosure may be applied to scenarios with complex textures, such as scenarios with distorted lines, uneven surfaces, or the like. In other words, in such scenarios with more complex textures, in the embodiments of the disclosure, intra prediction is directly performed, instead of encoding more residuals or dividing smaller blocks to make the texture within a single block simpler, and thus the embodiments of the disclosure may contribute to complex prediction by using as few flag bits as possible, and thereby improving compression efficiency.

An embodiment of the disclosure further provides an intra prediction method. The template of the current block is divided into sub-templates, and the prediction mode is determined according to the costs of the candidate modes on the sub-templates of the current block. Then, the intra prediction value of the current frame may be determined according to the prediction mode. In the embodiment of the disclosure, since the prediction mode is determined according to the sub-templates, the prediction mode has small costs on the sub-templates, that is, the prediction mode may perform well locally, which contributes to more accurate intra prediction, and thereby improving compression efficiency.

FIG. 14 illustrates a schematic flowchart of another intra prediction method 500 provided by an embodiment of the disclosure. The method 500 may be applied to an encoder, such as the encoder 100 in FIG. 1, or to a decoder, such as the decoder 200 in FIG. 2. In addition, the method 500 may be applied to the intra prediction unit 106 in the encoder 100, or to the intra prediction unit 204 in the decoder 200. As shown in FIG. 14, the method 500 includes operations 510 to 540.

In operation 510, a prediction mode parameter of a current block is obtained. The prediction mode parameter is configured to indicate that an intra prediction value of the current block is determined in template-based intra mode derivation (TIMD) manner.

In operation 520, a template of the current block is determined. The template includes at least two sub-templates.

Specifically, the operations 510 and 520 may refer to the description of the operations 310 and 320 in FIG. 3, which will not be repeated here.

In operation 530, a prediction mode is determined according to costs of candidate modes on a part of the at least two sub-templates.

Exemplarily, in a case where the entire template of the current block is divided into at least two sub-templates, one or more sub-templates may be one or more of the at least two sub-templates, for example, one sub-template, two sub-templates, or more, which is not limited.

Specifically, in a case where the template of the current block is divided into multiple sub-templates, a spatially close point has a strong correlation, and a spatially distant point has a weak correlation. Taking dividing the template into the upper sub-template and the left sub-template (for example, the aforementioned (a) in FIG. 8) as an example, in a case where some pixel points are close to the upper sub-template and far from the left sub-template, these points have strong correlations with the upper sub-template, that is, intra prediction modes that perform well on the upper sub-template are also more suitable for these pixel points. However, some intra prediction modes perform well on the upper sub-template and perform poorly on the left sub-template, which causes a poor performance of these modes on the entire template, and thus these modes may be discarded in the related art. However, in the embodiments of the disclosure, in a case where the prediction mode is determined according to the costs of the candidate modes on a part of the sub-templates, these intra prediction modes may be adopted.

Exemplarily, some candidate modes may be tried respectively on the sub-templates of the current block, for example, the mode with the smallest cost on each sub-template is selected as the prediction mode.

In some optional embodiments, at least two prediction modes may also be determined according to the costs of the candidate modes on one or more of the at least two sub-templates, and the costs of the candidate modes on the template (i.e., the entire template of the current block). In other words, the prediction modes determined by the embodiments of the disclosure may include modes that perform well on the sub-templates of the current block, and may further include modes that perform well on the entire template of the current block. Specifically, it is possible to refer to aforementioned FIG. 10 and related description.

In some optional embodiments, a mode that performs well on a local template (i.e., a mode with a smaller cost) does not necessarily perform well on the entire template, and thus some limitations may be further set when the at least two prediction modes are selected. For example, the cost of each of the at least two prediction modes on the entire template may be limited to not exceed a first value. Here, the first value is a preset threshold value, or the first value is an integer multiple, for example, twice, as much as the cost of the mode with the smallest cost on the template (i.e., mode 0) on the entire template (for example, costMode0), or otherwise, which is not limited.

As a specific example, in a case where mode 0, mode 1, and mode 2 are modes with the smallest cost on the entire template, sub-template 1, and sub-template 2, respectively, of the current block, the cost of mode 1 or mode 2 on the entire template may be further set as not exceeding twice as much as costMode0.

In operation 540, the intra prediction value of the current block is determined according to the prediction mode.

In some embodiments, in a case where there is one prediction mode, the intra prediction value of the current block may be calculated according to the prediction mode.

In some embodiments, in a case where there are at least two prediction modes, the weighting factor of each of the at least two prediction modes on the current block may be determined according to the cost of the prediction mode on the sub-templates. Then, the intra prediction value of the current block may be determined according to the weighting factors of the at least two prediction modes on the current block.

As a specific implementation, the at least two prediction modes have the same weighting factor on each unit of the current block.

As another specific implementation, the at least two prediction modes have different weighting factors on different units of the current block. Optionally, the method 500 may further include the following operations. The current block is divided into at least two units. Then, a weighting factor of each of the at least two prediction modes on a first unit is determined according to the costs of the at least two prediction modes on the sub-templates, here, the at least two units include the first unit. Then, the intra prediction value of the current block is determined according to the weighting factors of the at least two prediction modes on the first unit.

In other words, the weighting factors of at least two prediction modes on different units of the current block may be calculated according to the costs of the at least two prediction modes on different sub-templates of the template. Optionally, in a case where the weighting factor of each of the at least two prediction modes on the first unit is determined according to the costs of the at least two prediction modes on the sub-template, the sub-template includes a sub-template, which is the closest to the first unit, of the two sub-templates, for example, the sub-template may be adjacent to the first unit. Specifically, the weighting factor may be determined with reference to the aforementioned method 300 or 400, which is not limited by the disclosure.

Therefore, in the embodiments of the disclosure, the template of the current block is divided into sub-templates, and the prediction mode is determined according to the costs of the candidate modes on the sub-templates of the current block. Then, the intra prediction value of the current frame may be determined according to the prediction mode. Since the prediction mode is determined according to the sub-templates, the prediction mode has small costs on the sub-templates, that is, the prediction mode may perform well locally, which contributes to more accurate intra prediction, and thereby improving compression efficiency.

In addition, in the embodiments of the disclosure, the weighting factor of each of at least two prediction modes on different units (for example, sub-blocks, parts, pixel points, or the like) of the current block may be determined, and thus different weighting factors may be set for different units of the current block. Therefore, the embodiments of the disclosure contribute to determining the intra prediction value of the current block more accurately, and thereby improving compression efficiency.

It is to be noted that the intra prediction method in the embodiments of the disclosure may be applied to both the encoder and the decoder, which is not limited by the disclosure. With the intra prediction method provided by the embodiments of the disclosure, a good prediction effect may be obtained at the encoder 100, which improves coding performance, and correspondingly, video decoding recovery quality may also be improved at the decoder 200, thereby improving decoding performance. Specifically, when the encoder codes or attempts to code the TIMD and the decoder decodes the TIMD, the coding process and the decoding process may use the same predetermined rules or operations, for example, the aforementioned method 300, or method 400, or method 500, to calculate the prediction value of the TIMD mode. In other words, the process of presetting the TIMD mode and using the prediction block generated by the TIMD mode is the same at the coding side and the decoding side.

The specific implementations of the disclosure are described in detail above in conjunction with the drawings, but the disclosure is not limited to the specific details in the above implementations. Within the scope of the technical conception of the disclosure, a variety of simple variations of the technical solutions of the disclosure may be carried out, and all of these simple variations fall within the scope of protection of the disclosure. For example, the various specific technical features described in the above specific implementations may be combined in any suitable manner without contradiction, and in order to avoid unnecessary repetition, various possible combinations are not separately illustrated in the disclosure. Further, for example, various different implementations of the disclosure may also be combined in any manner, and as long as they do not contradict the idea of the disclosure, they should be regarded as the contents disclosed in the disclosure.

It is further to be understood that in the various method embodiments of the disclosure, the magnitude of the serial numbers of the above processes does not imply the order of execution, and the order of execution of the processes shall be determined by their functions and internal logic, and shall not constitute any limitation on the implementation process of the embodiments of the disclosure. It is to be understood that the serial numbers may be interchanged in appropriate cases, such that the described embodiments of the disclosure may be implemented in an order other than those shown in the drawings or described.

The method embodiments of the disclosure are described in detail above in conjunction with FIGS. 1 to 14, and the apparatus embodiments of the disclosure are described in detail below in conjunction with FIGS. 15 and 16.

FIG. 15 is a schematic block diagram of an intra prediction apparatus 700 of an embodiment of the disclosure. The apparatus may be an encoder, such as the encoder 100 in FIG. 1, or a decoder, such as the decoder 200 in FIG. 1. As shown in FIG. 15, the apparatus 700 may include an obtaining unit 710 and a determination unit 720.

The obtaining unit 710 is configured to obtain a prediction mode parameter of a current block. The prediction mode parameter is configured to indicate that an intra prediction value of the current block is determined in template-based intra mode derivation (TIMD) manner.

The determination unit 720 is configured to determine a template of the current block. The template includes at least two sub-templates.

The determination unit 720 is further configured to determine a prediction mode according to costs of candidate modes on one or more of the at least two sub-templates.

The determination unit 720 is further configured to determine the intra prediction value of the current block according to the prediction mode.

In some optional embodiments, a cost of the prediction mode on the template does not exceed a first value. The first value is a preset threshold value or the first value is an integer multiple of a cost of a first prediction mode on the template, and the first prediction mode is a mode with the smallest cost on the template.

In some optional embodiments, the determination unit 720 is specifically configured to: determine at least two prediction modes according to the costs of the candidate modes on the sub-templates and costs of the candidate modes on the template; determine a weighting factor of each of the at least two prediction modes on the current block according to costs of the at least two prediction modes on the sub-templates; and determine the intra prediction value of the current block according to the weighting factors of the at least two prediction modes on the current block.

In some optional embodiments, the apparatus further includes a division unit configured to divide the current block into at least two sub-blocks.

Here, the determination unit 720 is specifically configured to: determine a weighting factor of the each of the at least two prediction modes on a first sub-block according to the cost of the prediction mode on the sub-templates, herein the at least two sub-blocks include the first sub-block; and determine the intra prediction value of the current block according to the weighting factors of the at least two prediction modes on the first sub-block.

In some optional embodiments, the at least two sub-templates include at least one of a pixel block adjacent to the left side of the current block, a pixel block adjacent to the upper side of the current block, a pixel block at the left top of the current block, a pixel block at the left bottom of the current block, or a pixel block at the right top of the current block.

In some optional embodiments, the current block includes a coding unit (CU) or a prediction unit (PU).

It is to be understood that the apparatus embodiments and the method embodiments may correspond to each other, and a similar description may refer to the method embodiments, which is not repeated here to avoid duplication. Specifically, the intra prediction apparatus 700 in the embodiments may correspond to the corresponding subject that executes the method 400 in the embodiments of the disclosure, and the aforementioned and other operations and/or functions of the various modules in the intra prediction apparatus 700 are respectively for the purpose of realizing the various methods in FIG. 12, or corresponding flows in the methods in FIG. 12, which is not repeated here for the sake of brevity.

The apparatus and system of the embodiments of the disclosure is described above from the perspective of functional modules in combination with the drawings. It is to be understood that the functional module may be implemented in a hardware form, by instructions in a software form, and by a combination of hardware and software modules. Specifically, each step of the method embodiments in the embodiments of the disclosure may be completed through a hardware integrated logic circuit and/or instructions in a software form in a processor. The steps of the methods disclosed in combination with the embodiments of the disclosure may directly be embodied to be executed and completed by a hardware decoding processor, or executed and completed by a combination of hardware and software modules in the decoding processor. Optionally, the software module may be located in a mature storage medium in the art, such as a Random Access Memory, a flash memory, a Read-Only Memory, a Programmable Read-Only Memory, an Electrically Erasable Programmable Memory or a register. The storage medium is located in a memory, and the processor reads the information in the memory to complete the steps of the above method embodiments in combination with its hardware.

FIG. 16 is a schematic block diagram of an electronic device 800 provided by an embodiment of the disclosure.

As shown in FIG. 16, the electronic device 800 may include a memory 810 and a processor 820.

The memory 810 is configured to store a computer program and transmit the program codes to the processor 820. In other words, the processor 820 may call and run the computer program stored in the memory 810, to realize the intra prediction method in the embodiments of the disclosure.

For example, the processor 820 may be configured to perform the operations in the aforementioned method 300, 400, or 500 according to instructions in the computer program.

In some embodiments of the disclosure, the processor 820 may include, but is not limited to:

a general purpose processor, a Digital Signal Processor (DSP), an Application Specific Integrated Circuit (ASIC), a Field Programmable Gate Array (FPGA) or other programmable logic devices, a discrete gate or a transistor logic device, a discrete hardware component, or the like.

In some embodiments of the disclosure, the memory 810 includes, but is not limited to a volatile memory and/or a non-volatile memory. Here, the non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a synch link DRAM (SLDRAM) and a Direct Rambus RAM (DR RAM).

In some embodiments of the disclosure, the computer program may be divided into one or more modules. The one or more modules are stored in the memory 810 and executed by the processor 820 to complete the coding method provided by the disclosure. The one or more modules may be a series of computer program instruction segments capable of completing a particular function, and the instruction segments are configured to describe the execution process of the computer program in the electronic device 800.

Optionally, as shown in FIG. 8, the electronic device 800 may further include a transceiver 830.

The transceiver 830 may be connected to the processor 820 or the memory 810.

The processor 820 may control the transceiver 830 to communicate with other devices, specifically, to send information or data to other devices, or to receive information or data sent by other devices. The transceiver 830 may include a transmitter and a receiver. The transceiver 830 may further include an antenna. The number of the antennas may be one or more.

It is to be understood that various components in the electronic device 800 are connected through a bus system. Here, in addition to a data bus, the bus system further includes a power bus, a control bus, and a status signal bus.

According to an aspect of the disclosure, a communication apparatus is provided. The communication apparatus includes a processor and a memory. The memory is configured to store a computer program, and the processor is configured to call and run the computer program stored in the memory, to enable the encoder to execute the method in the aforementioned method embodiments.

According to an aspect of the disclosure, a computer storage medium is provided. The computer storage medium stores a computer program thereon, and the computer program, when executed by a computer, enables the computer to execute the method in the aforementioned method embodiments. Alternatively, the embodiments of the disclosure further provide a computer program product including instructions, and the instructions, when executed by a computer, enable the computer to execute the method in the aforementioned method embodiments.

According to another aspect of the disclosure, a computer program product or computer program is provided. The computer program product or computer program includes computer instructions that are stored in a computer-readable storage medium. A processor of a computer device reads the computer instructions from the computer-readable storage medium, and the processor executes the computer instructions to enable the computer device to execute the method in the aforementioned method embodiments.

In other words, when implemented by software, the functions may be implemented in whole or in part in form of a computer program product. The computer program product includes one or more computer instructions. The computer program instructions generate in whole or in part, when loaded and executed on a computer, a flow or function in accordance with the embodiments of the disclosure. The computer may be a general purpose computer, a special purpose computer, a computer network, or other programmable devices. The computer instructions may be stored in a computer-readable storage medium or transmitted from one computer-readable storage medium to another computer-readable storage medium. For example, the computer instructions may be transmitted from a web site, computer, server, or data center to another website site, computer, server, or data center in a wired manner (for example, a coaxial cable, an optical fiber optic, or a digital subscriber line (DSL)) or in a wireless manner (for example, infrared, wireless, microwave, or the like). The computer-readable storage medium may be any available medium accessible to a computer, or a data storage device such as a server, a data center, or the like, which includes one or more available media integrated. The available medium may be a magnetic medium (for example, a floppy disk, a hard disk or a tape), an optical medium (for example, a digital video disc (DVD)), a semiconductor medium (for example, a solid state disk (SSD)), or the like.

It is to be understood that in the embodiments of the disclosure, "B corresponding to A" indicates that B is associated with A. In an implementation, B may be determined according to A. However, it is further to be understood that B being determined according to A does not mean that B is determined according to A alone, but that B may also be determined according to A and/or other information.

In the description of the disclosure, unless otherwise illustrated, "at least one" means one or more, and "multiple" means two or more than two. In addition, "and/or" describes an association relationship of associated objects, representing that there may be three kinds of relationships. For example, A and/or B may represent three conditions, i.e., independent existence of A, existence of both A and B and independent existence of B, where A and B may be singular or plural. The character "/" usually represents that the previous and next associated objects are in an "or" relationship. The expression "at least one of the following" or any similar expression means any combination of these items, including any combination of singular or plural items. For example, "at least one of a, b, or c" may represent a, b, c, a-b, a-c, b-c, or a-b-c, where a, b, and c may be single or multiple.

It is further to be understood that the descriptions "first", "second", or the like appearing in the embodiments of the disclosure are only for the purpose of illustrating and distinguishing the described objects without any order, and do not indicate a particular limitation on the number of devices in the embodiments of the disclosure, and do not constitute any limitation on the embodiments of the disclosure.

It is further to be understood that particular features, structures or characteristics in the specification, which are related to the embodiments, are included in at least one embodiment of the disclosure. Furthermore, these particular features, structures or characteristics may be combined in one or more embodiments in any suitable manner.

In addition, the terms "comprising" and "having", and any variations thereof, are intended to cover non-exclusive inclusion. For example, a process, method, system, product, or server that includes a series of operations or units is not required to be limited to the operations or units clearly listed, but may include other operations or units that are not clearly listed, or inherent to the process, method, product or device.

Those of ordinary skill in the art may realize that the modules and algorithm steps of each example described in combination with the embodiments disclosed in the disclosure may be implemented by electronic hardware or a combination of computer software and electronic hardware.

Whether these functions are executed in a hardware or software manner depends on specific applications and design constraints of the technical solutions. Professionals may realize the described functions for each specific application by using different methods, but such realization shall fall within the scope of the disclosure.

In several embodiments provided by the disclosure, it is to be understood that the disclosed devices, apparatuses and methods may be implemented in other manners. For example, the apparatus embodiments described above are only schematic. For example, division of the modules is only a kind of logic function division, and there may be other division manners during a practical implementation. For example, multiple modules or components may be combined or integrated into another system, or some characteristics may be neglected or not executed. In addition, coupling or direct coupling or communication connection between various displayed or discussed components may be indirect coupling or communication connection through some interfaces, apparatuses or modules, and may be electrical, mechanical, or in other forms.

The modules illustrated as separate components may or may not be physically separated, and components displayed as modules may or may not be physical modules, i.e., may be located in the same place, or may also be distributed to multiple network units. Part or all of the modules may be selected according to practical requirements to achieve the purpose of the solutions of the embodiments. For example, various functional modules in various embodiments of the disclosure may be integrated into a processing module, or each module may physically exist independently, or two or more than two modules may be integrated into a module.

The above is only specific implementation manners of the disclosure, but the scope of protection of the disclosure is not limited thereto. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. An intra prediction method, applied to a decoder, wherein the method comprises:

obtaining a prediction mode parameter of a current block, wherein the prediction mode parameter is configured to indicate that an intra prediction value of the current block is determined in template-based intra mode derivation (TIMD) manner;

determining a template of the current block, wherein the template comprises at least two sub-templates;

determining a prediction mode according to costs of candidate modes on a part of the at least two sub-templates; and determining the intra prediction value of the current block according to the prediction mode, wherein determining the prediction mode according to the costs of the candidate modes on the part of the at least two sub-templates comprises:

determining at least two prediction modes according to the costs of the candidate modes on the part of the at least two sub-templates and costs of the candidate modes on the template;

wherein determining the intra prediction value of the current block according to the prediction mode comprises:

determining a weighting factor of each of the at least two prediction modes on the current block according to costs of the at least two prediction modes on the at least two sub-templates; and determining the intra prediction value of the current block according to the weighting factors of the at least two prediction modes on the current block.

2. The method of claim 1, wherein a cost of the prediction mode on the template does not exceed a first value, the first value is a preset threshold value or the first value is an integer multiple of a cost of a first prediction mode on the template, and the first prediction mode is a mode with a smallest cost on the template.

3. The method of claim 1, further comprising:

dividing the current block into at least two sub-blocks;

wherein determining the weighting factor of each of the at least two prediction modes on the current block according to the costs of the at least two prediction modes on the at least two sub-templates comprises:

determining a weighting factor of each of the at least two prediction modes on a first sub-block according to the costs of the at least two prediction modes on the sub-templates, wherein the at least two sub-blocks comprise the first sub-block;

wherein determining the intra prediction value of the current block according to the weighting factors of the at least two prediction modes on the current block comprises:

determining the intra prediction value of the current block according to the weighting factors of the at least two prediction modes on the first sub-block.

4. The method of claim 1, wherein determining the intra prediction value of the current block according to the prediction mode further comprises:

if the costs of the at least two prediction modes is greater than a predefined value, determining the intra prediction value of the current block according to at least one prediction mode of the at least two prediction modes, cost of the at least one prediction mode being less than other prediction modes of the at least two prediction modes.

5. The method of claim 1, wherein the at least two sub-templates comprise at least one of a pixel block adjacent to a left side of the current block, a pixel block adjacent to an upper side of the current block, a pixel block at left top of the current block, a pixel block at left bottom of the current block, or a pixel block at right top of the current block.

6. The method of claim 1, wherein the current block comprises a coding unit (CU) or a prediction unit (PU).

7. An intra prediction method, applied to an encoder, wherein the method comprises:

obtaining a prediction mode parameter of a current block, wherein the prediction mode parameter is configured to indicate that an intra prediction value of the current block is determined in a template-based intra mode derivation (TIMD) manner;

determining a template of the current block, wherein the template comprises at least two sub-templates;

determining a prediction mode according to costs of candidate modes on a part of the at least two sub-templates; and determining the intra prediction value of the current block according to the prediction mode, wherein determining the prediction mode according to the costs of the candidate modes on the part of the at least two sub-templates comprises:

determining at least two prediction modes according to the costs of the candidate modes on the part of the at least two sub-templates and costs of the candidate modes on the template;

wherein determining the intra prediction value of the current block according to the prediction mode comprises:

determining a weighting factor of each of the at least two prediction modes on the current block according to costs of the at least two prediction modes on the at least two sub-templates; and determining the intra prediction value of the current block according to the weighting factors of the at least two prediction modes on the current block.

8. The method of claim 7, wherein a cost of the prediction mode on the template does not exceed a first value, the first value is a preset threshold value or the first value is an integer multiple of a cost of a first prediction mode on the template, and the first prediction mode is a mode with a smallest cost on the template.

9. The method of claim 7, further comprising:

dividing the current block into at least two sub-blocks;

wherein determining the weighting factor of each of the at least two prediction modes on the current block according to the costs of the at least two prediction modes on the at least two sub-templates comprises:

determining a weighting factor of each of the at least two prediction modes on a first sub-block according to the costs of the at least two prediction modes on the sub-templates, wherein the at least two sub-blocks comprise the first sub-block;

wherein determining the intra prediction value of the current block according to the weighting factors of the at least two prediction modes on the current block comprises:

determining the intra prediction value of the current block according to the weighting factors of the at least two prediction modes on the first sub-block.

10. The method of claim 7, wherein the at least two sub-templates comprise at least one of a pixel block adjacent to a left side of the current block, a pixel block adjacent to an upper side of the current block, a pixel block at left top of the current block, a pixel block at left bottom of the current block, or a pixel block at right top of the current block.

11. The method of claim 7, wherein the current block comprises a coding unit (CU) or a prediction unit (PU).

12. A decoder, comprising: a processor and a memory;

wherein the memory is configured to store a computer program, and the processor is configured to call and run the computer program stored in the memory, to enable the decoder to execute operations of:

obtaining a prediction mode parameter of a current block, wherein the prediction mode parameter is configured to indicate that an intra prediction value of the current block is determined in template-based intra mode derivation (TIMD) manner;

determining a template of the current block, wherein the template comprises at least two sub-templates;

determining a prediction mode according to costs of candidate modes on a part of the at least two sub-templates; and determining the intra prediction value of the current block according to the prediction mode, wherein when determining the prediction mode according to the costs of the candidate modes on the part of the at least two sub-templates, the processor is further configured to call and run the computer program stored in the memory, to enable the decoder to: determine at least two prediction modes according to the costs of the candidate modes on the part of the at least two sub-templates and costs of the candidate modes on the template;

and wherein when determining the intra prediction value of the current block according to the prediction mode, the processor is further configured to call and run the computer program stored in the memory, to enable the decoder to:

determine a weighting factor of each of the at least two prediction modes on the current block according to costs of the at least two prediction modes on the at least two sub-templates; and determine the intra prediction value of the current block according to the weighting factors of the at least two prediction modes on the current block.

13. The decoder of claim 12, wherein a cost of the prediction mode on the template does not exceed a first value, the first value is a preset threshold value or the first value is an integer multiple of a cost of a first prediction mode on the template, and the first prediction mode is a mode with a smallest cost on the template.

14. The decoder of claim 12, wherein the processor is further configured to call and run the computer program stored in the memory, to enable the decoder to:

divide the current block into at least two sub-blocks;

wherein when determining the weighting factor of each of the at least two prediction modes on the current block according to the costs of the at least two prediction modes on the at least two sub-templates, the processor is further configured to call and run the computer program stored in the memory, to enable the decoder to:

determine a weighting factor of each of the at least two prediction modes on a first sub-block according to the costs of the at least two prediction modes on the sub-templates, wherein the at least two sub-blocks comprise the first sub-block;

wherein when determining the intra prediction value of the current block according to the weighting factors of the at least two prediction modes on the current block, the processor is further configured to call and run the computer program stored in the memory, to enable the decoder to:

determine the intra prediction value of the current block according to the weighting factors of the at least two prediction modes on the first sub-block.

15. The decoder of claim 12, wherein when determining the intra prediction value of the current block according to the prediction mode, the processor is further configured to call and run the computer program stored in the memory, to enable the decoder to:

if the costs of the at least two prediction modes is greater than a predefined value, determine the intra prediction value of the current block according to at least one prediction mode of the at least two prediction modes, cost of the at least one prediction mode being less than other prediction modes of the at least two prediction modes.

16. The decoder of claim 12, wherein the at least two sub-templates comprise at least one of a pixel block adjacent to a left side of the current block, a pixel block adjacent to an upper side of the current block, a pixel block at left top of the current block, a pixel block at left bottom of the current block, or a pixel block at right top of the current block.

17. The decoder of claim 12, wherein the current block comprises a coding unit (CU) or a prediction unit (PU).

18. A non-transitory computer-readable storage medium, having a computer program and a bitstream stored thereon, wherein the computer program, when executed by a processor, enables the processor to perform the steps of the method of claim 7 to generate the bitstream.

* * * * *